United States Patent [19]

Parker et al.

[11] Patent Number: 4,931,948

[45] Date of Patent: Jun. 5, 1990

[54] METHOD AND SYSTEM FOR CONTROLLING A SINGLE ZONE HVAC SUPPLYING MULTIPLE ZONES

[75] Inventors: Jeffrey L. Parker; Edward Parker, both of Jacksonville, Fla.

[73] Assignee: Parker Electronics, Inc., Jacksonville, Fla.

[21] Appl. No.: 13,870

[22] Filed: Feb. 12, 1987

[51] Int. Cl.[5] ........................ F25B 29/00; G06F 15/20

[52] U.S. Cl. ...................................... 364/505; 165/16; 165/22; 236/49.1; 236/1 C

[58] Field of Search ........................ 165/14, 16, 22, 26, 165/27; 236/49, 1 C; 364/505, 506, 557, 550, 551, 571, 143–145

[56] References Cited

U.S. PATENT DOCUMENTS

| | | | |
|---|---|---|---|
| 4,386,649 | 6/1983 | Hines et al. | 364/557 |
| 4,388,692 | 6/1983 | Jones et al. | 364/557 |
| 4,530,395 | 7/1985 | Parker et al. | 236/16 |
| 4,682,279 | 7/1987 | Watabe | 165/26 |
| 4,683,939 | 8/1987 | Levine | 165/22 |
| 4,716,957 | 1/1988 | Thompson et al. | 165/22 |

*Primary Examiner*—Parshotam S. Lall
*Assistant Examiner*—Ellis B. Ramirez
*Attorney, Agent, or Firm*—Arthur G. Yeager; Earl L. Tyner

[57] ABSTRACT

An improved monitoring and control system for a heating, ventilating and air conditioning (HVAC) unit which provides zone control in plural zones in which each zone includes a thermostat which controls a damper for its zone. One thermostat is selected and programmed to function as a monitor or master thermostat for selective actuation of the HVAC unit as well as controlling its zone damper. The other thermostats are programmed to function as slave thermostats and are interfaced with the master thermostat thereby allowing for independent zonal control in a multiple zone system which uses a single zone HVAC unit. The master thermostat may also receive control signals and data from higher intelligence such as a computer. Each thermostat is microcomputer-controlled with provision for both local and manufacturer programming via supplemental memory devices. The master thermostat contains a real time clock for time-basing the entire system with attendant advantages.

92 Claims, 9 Drawing Sheets

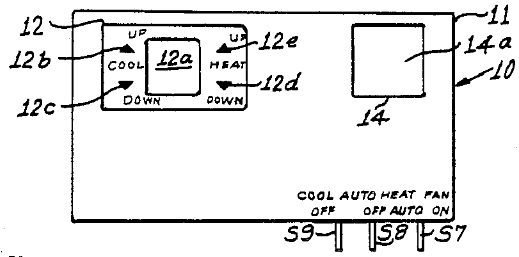
FIG. 1
FIG. 2
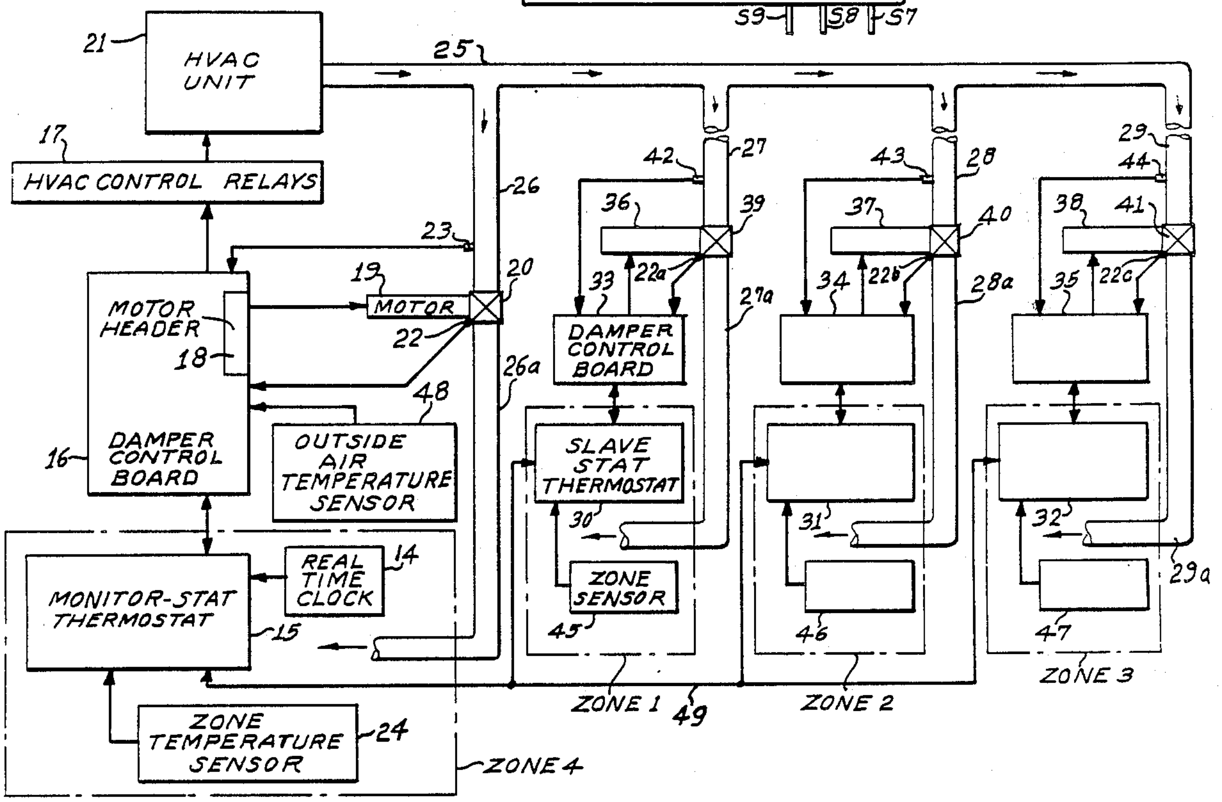
FIG. 3
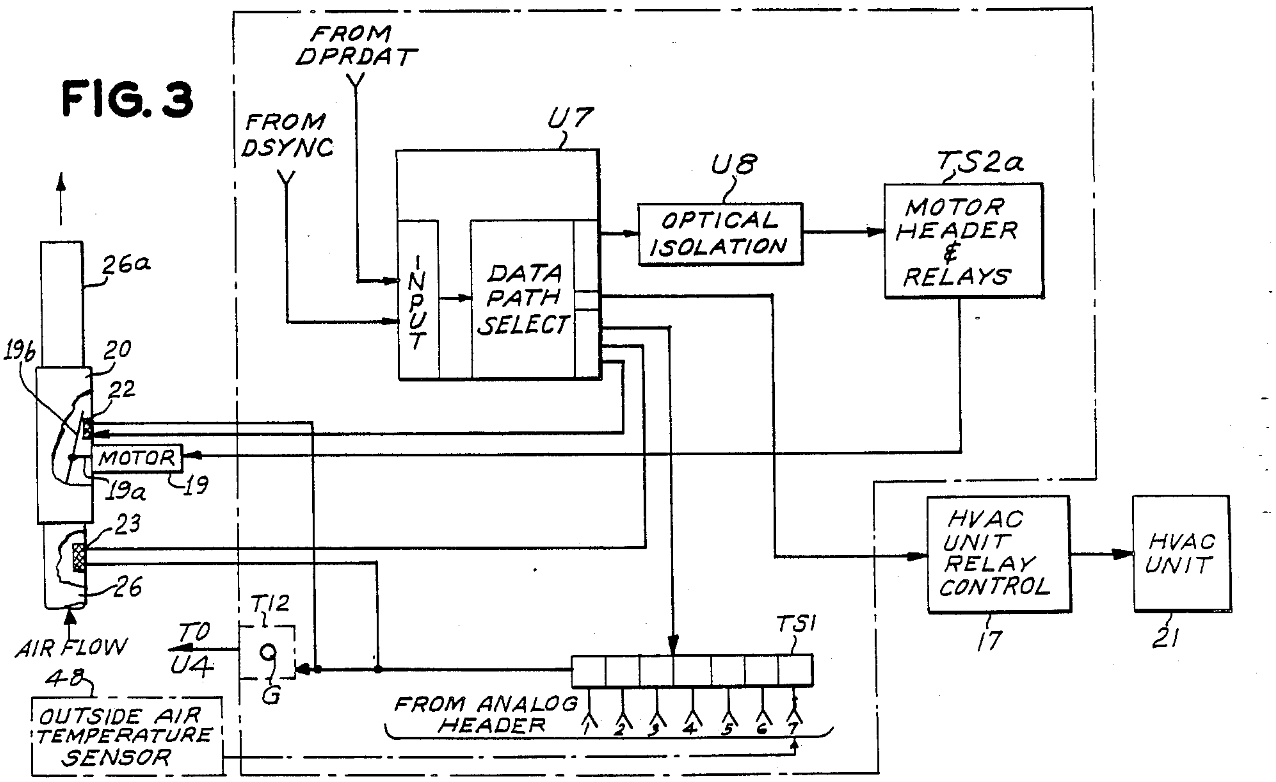

FIG. 5₁
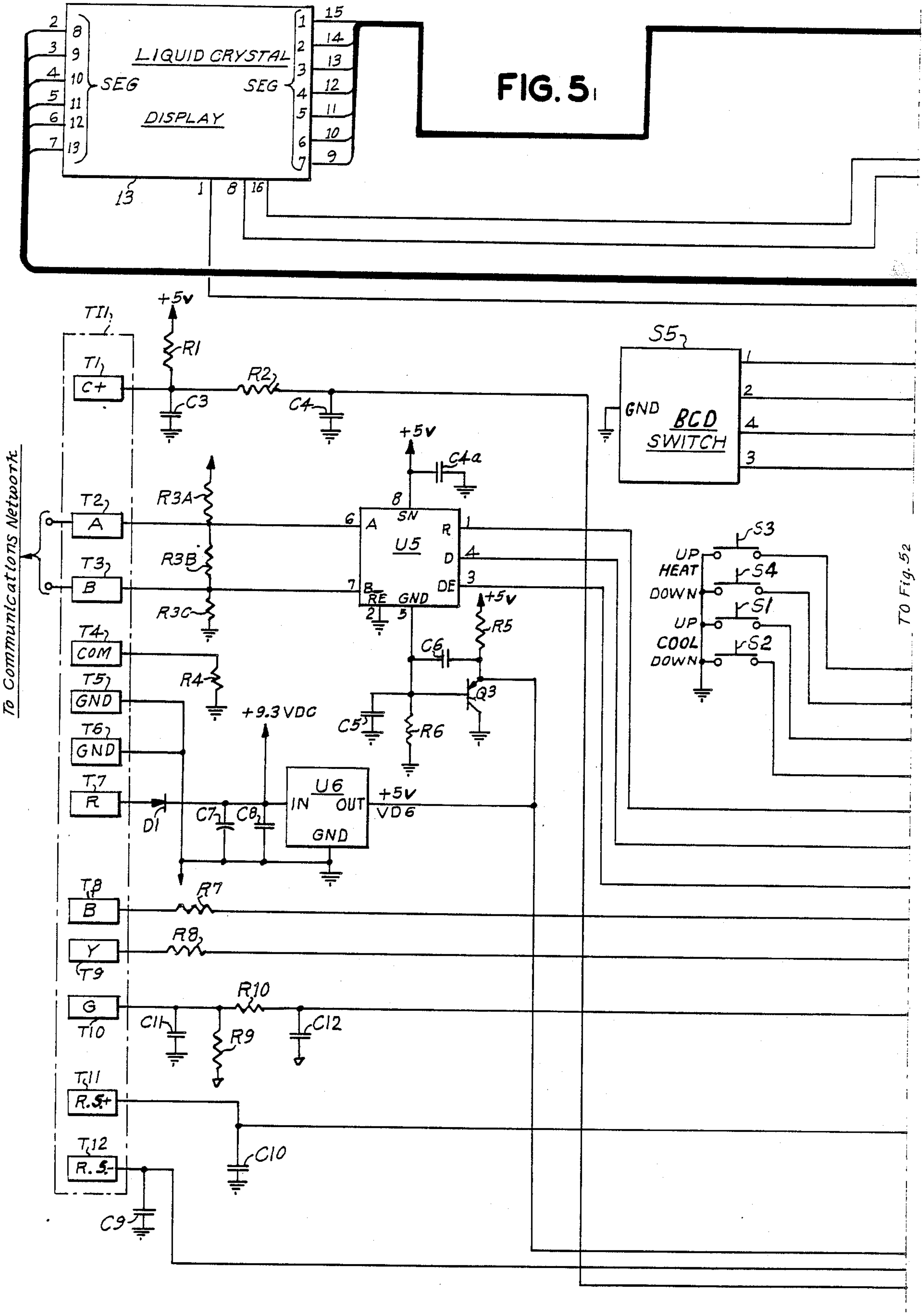

FIG. 5₂
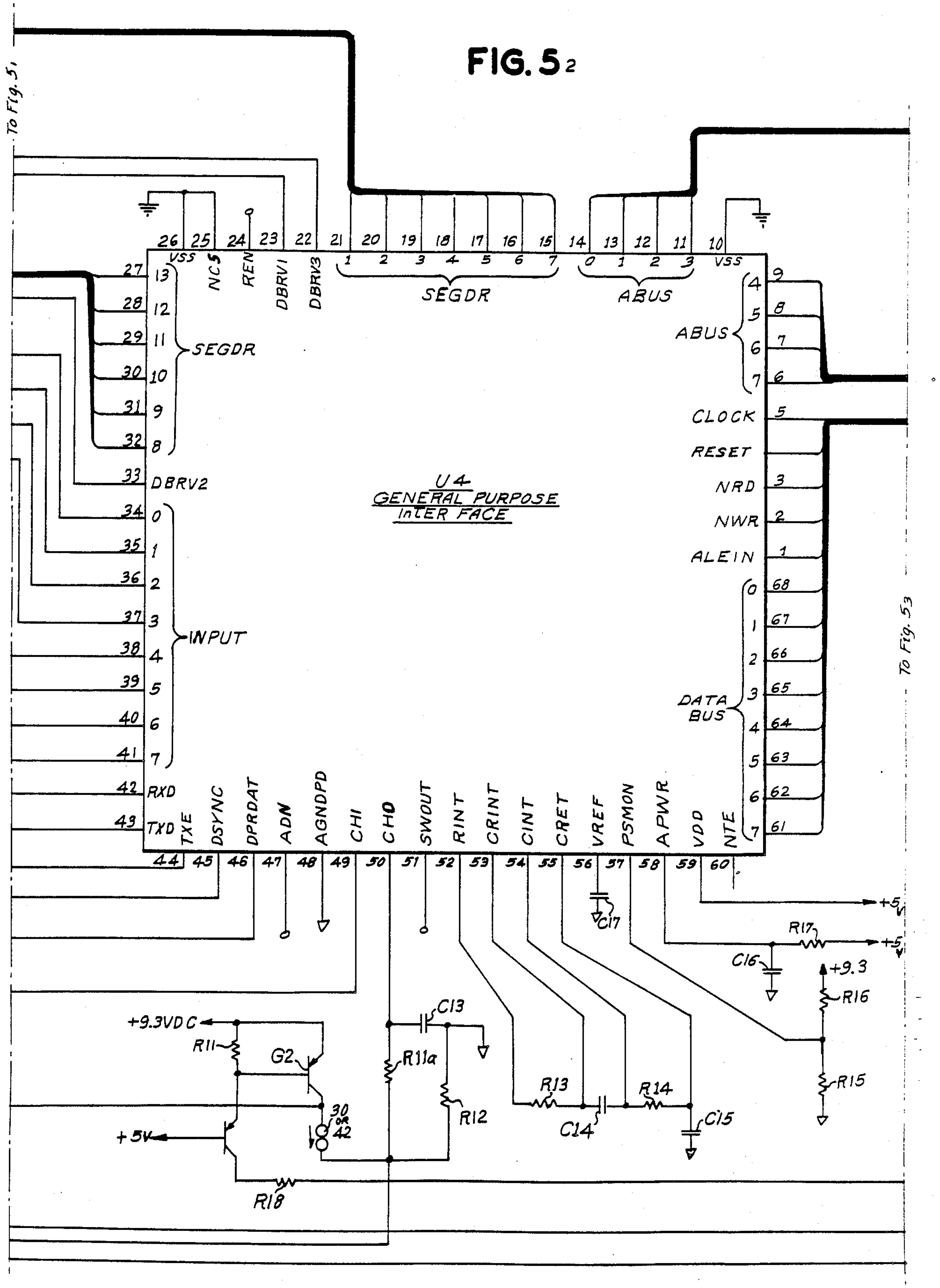

FIG. 5₃
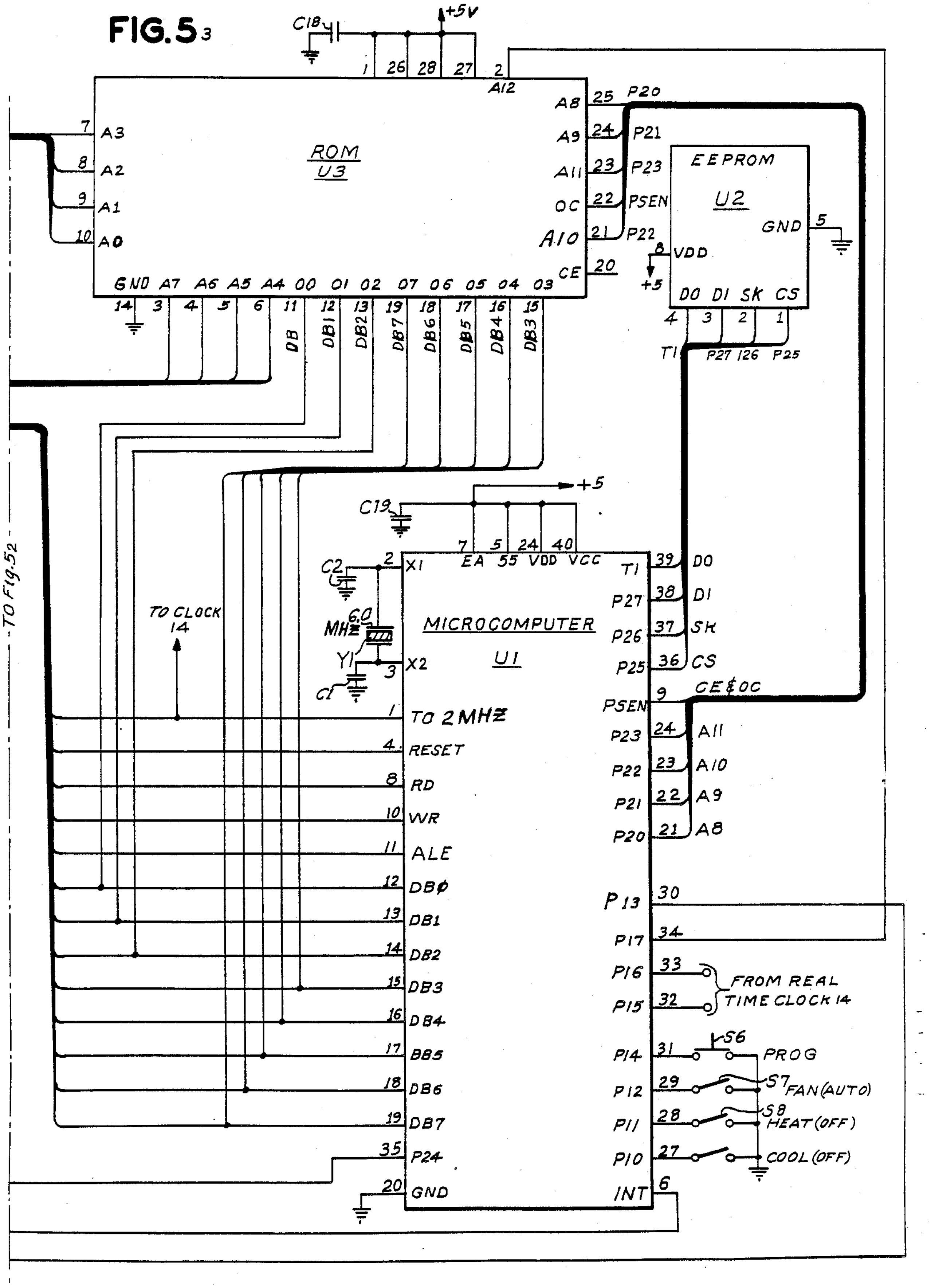

METHOD AND SYSTEM FOR CONTROLLING A SINGLE ZONE HVAC SUPPLYING MULTIPLE ZONES

BACKGROUND OF THE INVENTION

1. Field of the Invention

The present invention relates to the field of control systems and methods for use with heating, ventilation, and air conditioning (HVAC) units and particularly to thermostat-based control systems.

2. Prior Art

The present invention relates a microcomputer-controlled thermostat-based system for use in controlling the conditioning of air in multiple zones by way of a single-zone HVAC unit.

A number of methods of controlling the conditions in a plurality of zones from only a single zone HVAC unit are known to the prior art. A description of the difficulties and limitations associated with many of the methods attempted is disclosed in U.S. Pat. No. 4,530,395 (Parker, et al.) and is relevant here. Briefly, the problems center around the means by which a single-zone HVAC unit can be controlled from more than one thermostat. Probably one of the best solutions to this problem that is found in the prior art is disclosed in such patent. The objective there was to provide control of a single zone HVAC unit and its air distribution systems from a common set of thermostats in two or more wherein each thermostat could control both the single zone HVAC unit through a "monitor control" and its own respective zone damper. The system disclosed in such patent provides a "central control monitor" which receives information from the various individual zones and compares this information with various preset data to then properly control the dampers and the HVAC unit. While the system as described did meet the objectives of multiple zone control of a single zone HVAC unit it required the use of a dedicated microprocessor-controlled monitor to receive data from a plurality of zone thermostats. In the present invention, similar control of a single zone HVAC unit for use in multiple zones is accomplished by microcomputer controlled thermostats which can operate in either a slave or master function thus avoiding the need for complex and dedicated central control monitors. It is believed that the system and methods in accord with this invention which allows for control of a single HVAC utilizing master/slave thermostats in lieu of central control units represents a substantial departure from any prior art.

FEATURES OF THE INVENTION

Principal features of the invention include a microcomputer-controlled thermostat-based system wherein the microcomputer in each thermostat is supplemented by (1) an electronically erasable programmable read only memory (EEPROM) through which temperature settings and other parameters can be stored and (2) a read only memory (ROM) containing control algorithms in the form of instruction codes and fixed data for system operation, data display, and asynchronous communication to an external communications bus. Programming many operations of the thermostat is accomplished through a program switch to the microcomputer and a general purpose interface (GPI) also having data input switches.

The thermostat also has interface circuitry to receive inputs in the form of data and control signals and output signals from local and remote temperature detectors and by way of input ports.

In addition, switches allow for the enabling or disabling of the heating and cooling modes of the HVAC unit.

A damper control board contains circuitry to route operating signals from the microcomputer to the damper motor, the HVAC unit control relays and to an analog header for the selective enabling of remote analog sensing devices such as temperature and humidity detectors. The circuitry in the damper control board also enables duct temperature and damper travel limit sensors.

In addition, the master thermostat contains a real time clock for use in programming the operation of the device during different times-of-day and days of the week.

SUMMARY OF THE INVENTION

Systems and methods are disclosed herein for monitoring and controlling the condition of air in each of a plurality of zones via dampers in their respective ducts, such system employing at least one master and one or more slave thermostats. The thermostats are programmable microcomputer-controlled devices disclosed and claimed in our copending applications filed concurrently herewith and entitled Thermostat and Thermostat Control Assembly and the master thermostat controls the heating ventilating and cooling unit that supplies the system.

In accord with one aspect of the invention, a method controls the positioning of a plurality of dampers of zone duct damper means prior to activating a single HVAC unit that supplies heated or cooled conditioned air through a single duct system having duct damper means and ducts to a plurality of zones and zone thermostats associated with respective dampers comprises the steps of A. determining the demand for heating or cooling from all zone thermostats; B. determining the number of zones having a demand for heating or cooling from all zone thermostats; C. selectively preselecting the number of zones having demand for heating or cooling that is necessary to select the heating or cooling mode; D. comparing the numbers obtained from steps B and C and selecting the heating or cooling mode when the number of zones having a demand for heating or cooling respectively is equal to or greater than the number selected in step C; D. activating appropriate dampers to closed position if the zone thermostats controlling such appropriate dampers have no demand or demand a mode different than the mode selected in step D, and positioning open the other dampers; F. activating the HVAC unit in the selected mode until all zone thermostats demanding the selected mode have been satisfied; G. deactivating the HVAC unit; and H. repeating steps A–G for the other mode when demand for the other mode has been selected in accord with steps A–D. This method may include in step E the step of I. activating some of the other dampers to a partially open position depending upon the amount of demand by their respective thermostats and modulating such dampers between open and closed until the demand is satisfied. This method may also include the step of I. comparing the number of demands after steps A–D and if the demands for heating and cooling are equal, the HVAC unit will be activated in step F in the mode coincident with the demand of the zone with the greatest demand.

In other aspects the method includes the step of J. modulating between open and closed positions the zone dampers according to the respective control of the zone thermostats when there is insufficient demand to require activation of the HVAC unit in the heating or cooling mode by the zone thermostats from steps A–D. Step J is seen to include the steps of K. determining the zone temperature; L. determining the duct temperature; and M. comparing the zone temperature to the duct temperature and (1) when the duct temperature is warmer than the zone temperature, the thermostat operates the zone duct damper in the heating mode and substantially opens the zone duct damper upon the thermostat sensing a zone demand for heat when the zone temperature is a predetermined amount below set point and substantially closes the zone duct damper upon the thermostat sensing no zone demand or a zone demand for cooling, and (2) when the duct temperature is cooler than the zone temperature, the thermostat operates the zone duct damper in the cooling mode and substantially opens the zone duct damper upon the thermostat sensing a zone demand for cooling when the zone temperature is a predetermined amount above set point and substantially closes the zone duct damper upon the thermostat sensing no zone demand or zone demand for heat. Also, step J may include the step of (3) when there is no demand for heating or cooling in a zone or a demand different from that derived from a comparison of duct temperature and zone temperature in (1) or (2) and duct temperature is within predetermined limits, the zone duct damper is operated in the ventilation mode.

Furthermore, another method is disclosed in which one zone damper means and the HVAC unit is controlled by a programmable master thermostat and the other zones are controlled by respective programmable slave thermostats comprising the steps of A. setting the set point of each of the zone thermostats to the comfort level of the respective zone occupants; B. monitoring the demand for heating or cooling from all zone thermostats by the master thermostat which selects either of the heating or cooling mode of the HVAC unit; C. positioning the zone duct damper means open if the zone master or slave thermostats are demanding the selected mode and closed for the other damper means; D. activating the HVAC unit by the master thermostat in the selected mode until all zone thermostats demanding the selected mode have been satisfied; and E. deactivating the HVAC unit by the master thermostat. Also, another aspect includes the step of F. selecting the mode of operation of the HVAC unit in step B in accordance with the programming of the master thermostat such that when an equal number of zones demand heating and demand cooling and the number of such zones is greater than a preselected number programmed in the master thermostat the zone with the greatest demand is chosen as the reference zone and the HVAC unit is operated in a mode coincident with the mode demanded by the zone with the greatest demand. Other aspects provide the step of G. modulating between open and closed positions the zone dampers according to the respective control of the zone thermostats when there is insufficient demand to require activation of the HVAC unit by the zone thermostats via the programmable master thermostat in step F. The following step may be added: repeating steps B–F (or B–G) for the other mode when demand for the other mode has been selected in accord with step B. Also, step of partially opening some of the damper means depending upon the amount of demand for the selected mode by their respective thermostats and modulating such damper means between open and closed until the demand is satisfied, can be included in any of the methods hereinabove.

The modulating step G immediately hereabove includes the steps of H. determining the zone temperature; I. determining the duct temperature of the air in the supply duct; and J. comparing the zone temperature to the duct temperature and (a) when the duct temperature is warmer than the zone temperature, the thermostat operates the zone duct damper in the heating mode and substantially opens the zone duct damper upon the thermostat sensing a zone demand for heat when the zone temperature is a predetermined amount below set point and substantially closes the zone duct damper upon the thermostat sensing no zone demand or a zone demand for cooling, and (b) when the duct temperature is cooler than the zone temperature, the thermostat operates the zone duct damper in the cooling mode and substantially opens the zone duct damper upon the thermostat sensing a zone demand for cooling when the zone temperature is a predetermined amount above set point and substantially closes the zone duct damper upon the thermostat sensing no zone demand or zone demand for heat; and (c) when there is no demand for heating or cooling in a zone or a demand different from that derived from a comparison of duct temperature and zone temperature in (1) or (2) and duct temperature is within predetermined limits established by the respective zone thermostat, the zone duct damper is operated in the ventilation mode and is opened to the ventilation position. The method may also include any or all of the steps of selecting by the master thermostat a second reference zone if the demand in a second zone is of the same mode and if it exceeds the demand in the reference zone selected in step F; repeating steps B–G for the other mode when demand for the other mode has been selected in accord with step B; increasing the heating or cooling output of the HVAC unit by the master thermostat when duct temperature is not within predetermined set points established by the master thermostat when the HVAC unit has been activated in accord with steps B–D; and deactivating the increased heating or cooling of the HVAC unit by the master thermostat if the duct temperature exceeds predetermined set points established by the programmable master thermostat.

Another method may be time-based by the steps of A. programming the set points of the zone thermostats during a plurality of distinct time periods; B. determining the real time; C. monitoring the demand for heating or cooling from all zone thermostats by the master thermostat which selects either of the heating or cooling mode of the HVAC unit during a distinct time period; D. positioning the zone duct damper means open if the zone thermostats are demanding the selected mode and closed for the other damper means; E. activating the HVAC unit by the master thermostat in the selected mode until all the zone thermostats demanding the selected mode have been satisfied; and F. deactivating the HVAC unit by the master thermostat.

The time-basing may be incorporated in most, if not all, of the aforementioned steps of each of the above described methods.

Various aspects of the system for monitoring and controlling the condition of air in each of a plurality of zones when using a single HVAC unit to supply conditioned air to each zone via a damper means in a duct communicating with each zone comprises a programmable master thermostat means located in one zone to be controlled and interfaced with and controlling a damper means in a duct communicating with one zone and controlling the operation of an HVAC unit. The master thermostat receives information from a programmable slave thermostat means located in each other zone interfaced with and controlling respective damper means in the respective duct communicating with the respective other zone. Each thermostat determines the condition of the air in its associated zone. The master thermostat means activates the HVAC unit in accordance with its programming and in accordance with the information received from each programmable slave thermostat means and in accordance with information associated with its own zone to control the HVAC unit in the heating or cooling mode. The master thermostat means provides information to each slave thermostat means as to the desired mode of operation of the HVAC unit and each slave thermostat means controls the positioning of its respective damper means in the selected mode and the master thermostat means controls its own damper means prior to the activation of the HVAC unit by the master thermostat means. The information exchanged between the master thermostat and the slave thermostat is in the form of digital words. A first sensor is provided for each thermostat means for determining the temperature of the air in its respective zone and a second sensor is provided to determine the temperature of air in the respective duct supplying air to its respective zone. Each thermostat means includes means for establishing the desired temperature in its respective zone.

Additional aspects relate to the fact that the programmable master thermostat means determines the demand for heating or cooling from all zone thermostat means, determines the number of zones having demand for heating or cooling, compares such number with a preselected number defining the system demand number, and if the number of zones demanding heating or cooling equals or exceeds the system demand number, the master thermostat means selects the desired heating or cooling mode respectively of the HVAC unit and provides output signals to its damper control means and to all slave thermostat means for operating their respective damper means in a mode coincident with the desired mode of the HVAC unit. The programmable master thermostat means thereafter actuates the HVAC unit in the selected mode until all the thermostat means demanding the selected mode have been substantially satisfied and then deactivates the HVAC unit. The master thermostat means compares the number of zones having a demand for heating and cooling and if the number of zones having a demand for heating is equal to the number of zones demanding cooling and the number equal or exceed the system demand number, the master thermostat means selects the zone with the greatest demand as a reference zone and activates the HVAC unit in the mode coincident to that demanded by the reference zone until the reference zone is substantially satisfied.

The master thermostat means in yet other aspects periodically determines the demand from each zone and, if the demand in another zone, having a demand coincident with the mode in which the HVAC unit is activated, is greater than the reference zone, the other zone is selected as a new reference zone and the HVAC unit is operated until demand in the new reference zone is substantially satisfied. The master thermostat means also periodically receives duct temperature data from duct supplying the one zone and receives duct temperature data from each slave thermostat means and, if any duct temperature is not within predetermined set points established by the master thermostat means when the HVAC unit is being operated in the heating or cooling mode, the master thermostat means provides an output signal to the HVAC unit for increasing the heating or cooling output thereof in the mode of operation of the HVAC unit. The master thermostat means also deactivates the HVAC unit if duct temperature in any duct exceeds predetermined set points established by the master thermostat means without regard to the demand for heating or cooling in any zone. Each thermostat means includes indicating means for providing data indicative of the information in any digital word associated with the operation of the thermostat means.

Furthermore, the system includes means for providing signals indicative of the real time to the programmable master thermostat means, and the master thermostat means activates the HVAC unit in accordance with its programming and in accordance with the information received from each slave thermostat means and in accordance with information associated with its own zone to control the HVAC unit in the heating or cooling mode during distinct time periods established by the programming of the master thermostat means and the slave thermostat means. The master thermostat means also provides information including data indicative of the real time to each slave thermostat means. The information exchanged between the master thermostat and the slave thermostat is in the form of digital words including real time data. Each of the thermostats includes sensors for zone and duct temperature as well as means for establishing the desired temperature in its respective zone during a distinct time period. If the number of zones demanding heating or cooling equals or exceeds the system demand number during a distinct time period, the programmable master thermostat means selects the desired heating or cooling mode respectively of the HVAC unit, the operation of the system continues in the aforesaid manner. Additional aspects provide an improved system in which a programmable master thermostat means operates the HVAC unit and the damper in one zone and includes a master first circuit means responsive to input signals for establishing operating limits for the one zone and providing a first digital word output signal representative of the operating limits; master second circuit means responsive to input signals indicative of the actual condition of air in the one zone for providing a second digital word output signal representative of the actual condition of air therein; master third circuit means adapted to be coupled to a peripheral circuit means for receiving data from a peripheral circuit means and for providing a third digital word output signal representative of the information contained in such data; master fourth circuit means responsive to output signals from the first, second, and third circuit means for providing fourth digital word output signals for operating the damper associated with the one zone and the HVAC unit; master programmable logic means for providing digital word input signals to the fourth circuit means for selectively controlling the fourth circuit means; and master logic means for selectively operating the damper associated with the one zone and the HVAC unit in response to respective fourth digital word input signals from the fourth circuit means. Such a system also includes a programmable slave thermostat means for operating the damper in each other zone and includes a slave first circuit means responsive to input signals for establishing operating limits for the other zone and providing a first digital word output signal representative of the operating limits; slave second circuit means responsive to input signals indicative of the actual condition of air in the other zone for providing a second digital word output signal representative of the actual condition of air therein; slave third circuit means adapted to be coupled to the programmable master thermostat means for receiving data from the programmable master thermostat means and for providing a third digital word output signal representative of the information contained in such data; slave fourth circuit means responsive to output signals from the first, second, and third circuit means for providing fourth digital word output signals for operating the damper associated with the other zone; slave programmable logic means for providing digital word input signals to the fourth circuit means for selectively controlling the fourth circuit means; and slave logic means for selectively operating the damper associated with the other zone in response to respective fourth digital word input signals from the fourth circuit means.

The master thermostat means is provided with means for supplying information to the slave thermostat means. Each thermostat means further includes a first sensor located in its respective zone for providing an output signal representative of the actual temperature of its respective zone, each of second circuit means including means responsive to the outut signal from the first sensor for providing a second digital word output signal representative of the actual temperature in its zone. Each of the master and slave first circuit means includes means responsive to input signals for establishing the desired temperature in the respective zone and providing a first digital word output signal representative of the desired temperature therein. Each of the master and slave fourth circuit means is also selectively controlled by respective programmable logic means for comparing a digital word representative of the actual temperature in its respective zone and a digital word representative of desired temperature in its zone for determining the demand for heating or cooling or no demand in the respective zone.

Furthermore, each thermostat means further includes a second sensor located in each duct for determining the temperature therein and providing an output signal representative of the temperature in each duct, each master and slave second temperature in each duct, each master and slave second circuit means responsive to the output signal from the second sensor and providing a digital word output signal representative of the temperature of each duct. The master and slave fourth circuit means is selectively controlled by respective programmable logic means for comparing a digital word representative of zone temperature in the respective zone and a digital word repreşentative of duct temperature for determining the desired mode of operation of the respective damper. The fourth circuit means in the programmable master thermostat means is selectively controlled by the programmable logic means for determining the desired mode of operation of the HVAC unit in response to the demand for heating or cooling or no demand in the zones.

Aspects of the programmable logic means in each thermostat means provide a first program means such that when duct temperature in its respective duct is greater than zone temperature a digital word output signal is provided from the fourth circuit means to the logic means for operating the respective damper in the heating mode and for operating the respective damper in the cooling mode when the temperature in the respective duct is less than zone temperature when the HVAC unit is deactivated. The programmable logic means in the programmable master thermostat means includes a second program means such that when sufficient demand for heating or cooling exists in the zones, the programmable master thermostat means provides a first output signal to the programmable slave thermostat means for positioning its respective damper in the heating or cooling mode respectively and the master fourth circuit means provides a signal to the master logic means for operating its damper means in the heating or cooling mode; and a second output signal for activating the HVAC unit in the heating or cooling mode respectively; and, when sufficient demand for heating or cooling no longer exists in said zones, a third output signal for deactivating the HVAC unit. The programmable logic means in each programmable thermostat means also includes a third program means such that when the HVAC unit is deactivated, the fourth circuit means provides digital word output signals to the logic means for operating the respective damper in the heating or cooling or ventilation mode in response to a comparison of duct temperature of the respective duct, and desired zone temperature and actual zone temperature of the respective zone. Furthermore, the programmable logic means in each programmable thermostat means includes a fourth program means such that when duct temperature of its respective duct is within predetermined limits established by the programmable logic means digital word signals are provided from the fourth circuit means to its respective logic means for operating its respective damper in the ventilation mode when there is no demand for heating or cooling in the respective zone or a demand different from that derived from a comparison between actual zone temperature and duct temperature in the respective zone.

Features of the system are provided by the master fourth circuit means being selectively controlled by the master programmable logic means for determining the desired mode of operation of the HVAC unit in response to data received by the master third circuit means representative of the temperature of air in each zone controlled by programmable slave thermostats and in response to data indicative of the condition of air in its respective zone. The master fourth circuit means is selectively controlled by the master programmable logic means in response to data indicative of the demand for heating or cooling or no demand in its respective zone and in response to data received by the master third circuit means indicative of the demand for heating or cooling or no demand from respective zones controlled by the programmable slave thermostat means for providing output signals representative of the desired mode of operation of the HVAC unit when the number of zones having demand for heating or cooling equals or exceeds a predetermined number established by the master first circuit means.

The master programmable logic means provides other features including fifth program means such that when demand for heating or cooling exists in a number of zones equal to or exceeding the predetermined number established by the master first circuit means, the programmable master thermostat means provides first output signals to the programmable slave thermostat means associated with the other zones indicative of the desired mode of the HVAC unit, a second signal to the master logic means for operating the damper associated with its respective zone in the heating or cooling mode, respectively, a third signal to the master logic means for operating the HVAC unit in the heating or cooling mode, respectively; and a fourth output signal to the master logic means for deactivating the HVAC unit when sufficient demand for heating or cooling no longer exists. The master programmable logic means also includes a sixth program means such that when the number of zones demanding heating or cooling equals or exceeds a predetermined number established by the master first circuit means, the zone with the greatest demand is chosen as a reference zone and the HVAC unit is operated by the master logic means in the heating or cooling mode, respectively, until the reference zone is substantially satisfied. The master programmable logic means further includes a seventh program means such that when the number of zones demanding heating is equal to the number of zones demanding cooling, each heating and cooling number being greater than a predetermined number established by the master first circuit means the programmable master thermostat means provides a first output signal to the programmable slave thermostat means and to the master logic means for operating all dampers in a mode coincident with the heating or cooling mode of the zone with the greatest demand, a second output signal to the master logic means for activating the HVAC unit in a mode coincident with the demand for heating or cooling mode of the zone with the greatest demand, and a third output signal to the master logic means for deactivating the HVAC unit when the demand for heating or cooling has been substantially satisfied in the zone with the greatest demand. The master programmable logic means also includes an eighth program means such that when the HVAC unit has been activated in the heating or cooling mode, duct temperature associated with its respective zone and data indicative of duct temperature in each other zones received by the master third circuit means from the programmable slave thermostat means is compared with first predetermined limits established by the master programmable logic means and the master fourth circuit means provides an output signal to the master logic means for increasing the heating or cooling supplied by the HVAC unit when duct temperature is not within the first predetermined limits.

Additionally, the master programmable logic means includes a ninth program means such that when duct temperature in any zone exceeds a second predetermined limit established by the master programmable logic means, the master fourth circuit means provides an output signal to the master logic means for deactivating the HVAC unit regardless of the demand for heating or cooling in any zone. A tenth program means is included in the master programmable logic means such that, when insufficient demand for heating or cooling for operation of the HVAC unit exists and the duct temperature associated with its zone is not within the predetermined set points for the ventilation mode, the master fourth circuit means provides an output signal to the master logic means for operating its damper associated with its zone in the heating or cooling mode in response to a comparison of actual zone temperature and duct temperature associated with its zone. The master programmable logic means also includes an eleventh program means such that, when the zone having the greatest demand has been chosen as a first reference zone during operation of the HVAC unit in the heating or cooling mode, another zone is chosen as the reference zone if the other zone develops a greater demand for heating or cooling respectively than the first reference zone and the HVAC unit is operated by the master logic means in the heating or cooling mode respectively until the other zone is substantially satisfied.

The programmable master thermostat means includes a clock means for providing a real time reference for the operation of the programmable master thermostat means including each program means thereof and each programmable slave thermostat means, each master and slave first circuit means including means responsive to input signals for establishing separate and different operating conditions in the zone during distinct time periods. The means for providing signals indicative of the real time controls the operability of said programmable master thermostat means and each said programmable slave thermostat means according to different conditions during distinct time periods and each slave thermostat may include indicating means to display the real time from the clock means of the master thermostat.

DETAILED DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the monitor-thermostat of the control system in accord with this invention;

FIG. 2 is a pictorial diagram of the thermostat control system in accord with this invention;

FIG. 3 is a simplified schematic diagram of the damper control board and associated devices in accord with this invention;

Figure 6:
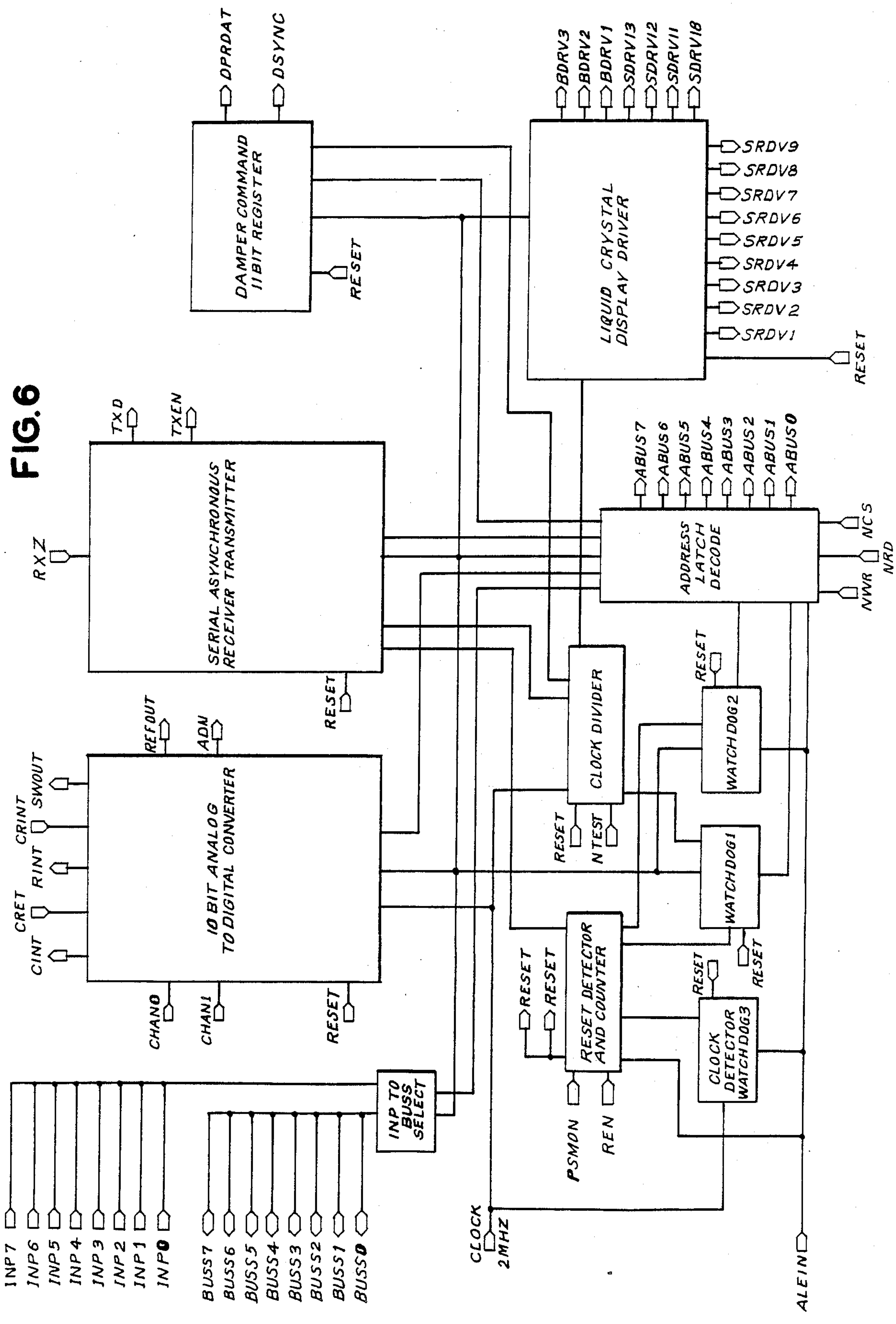
Figure 7:
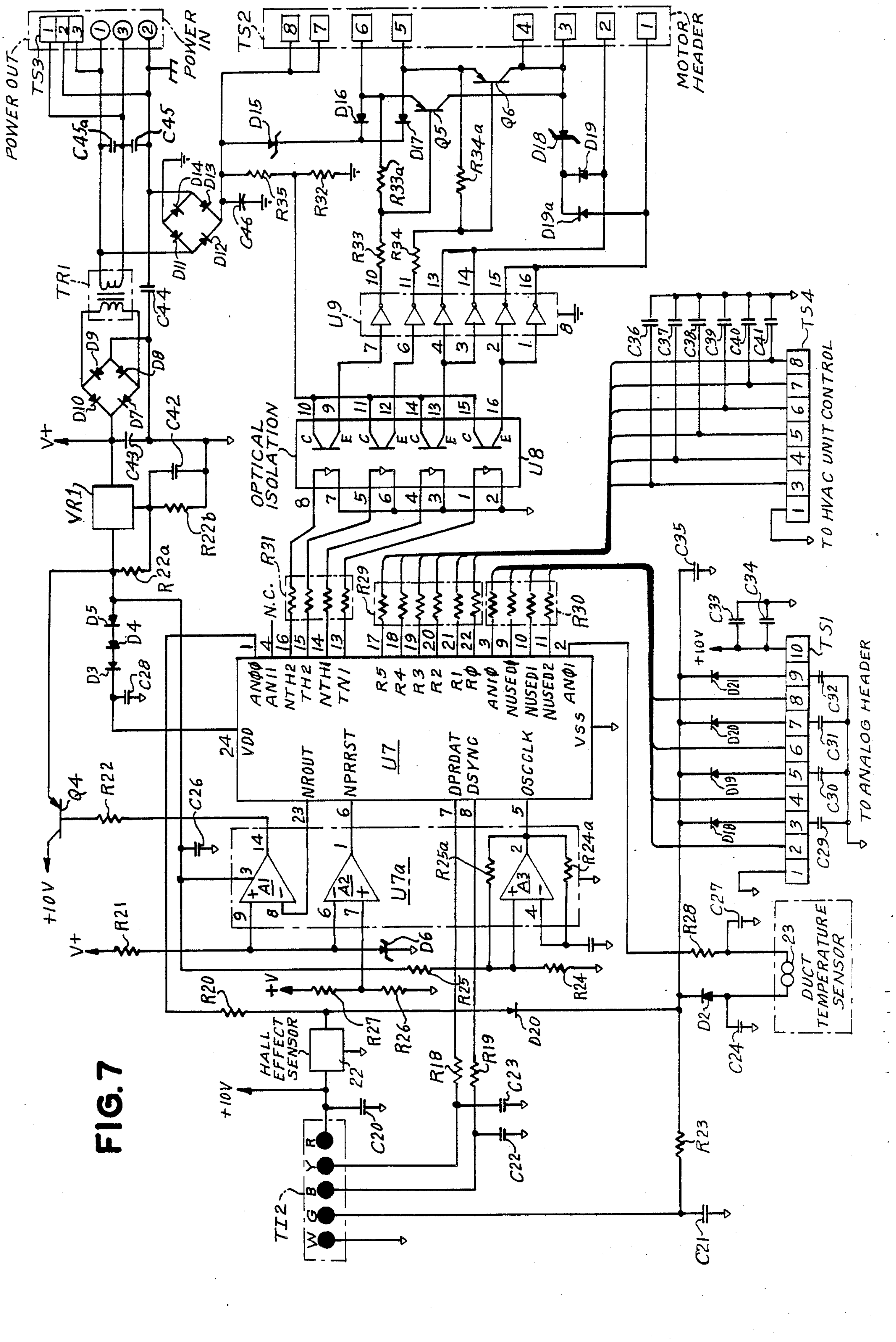
Figure 8:
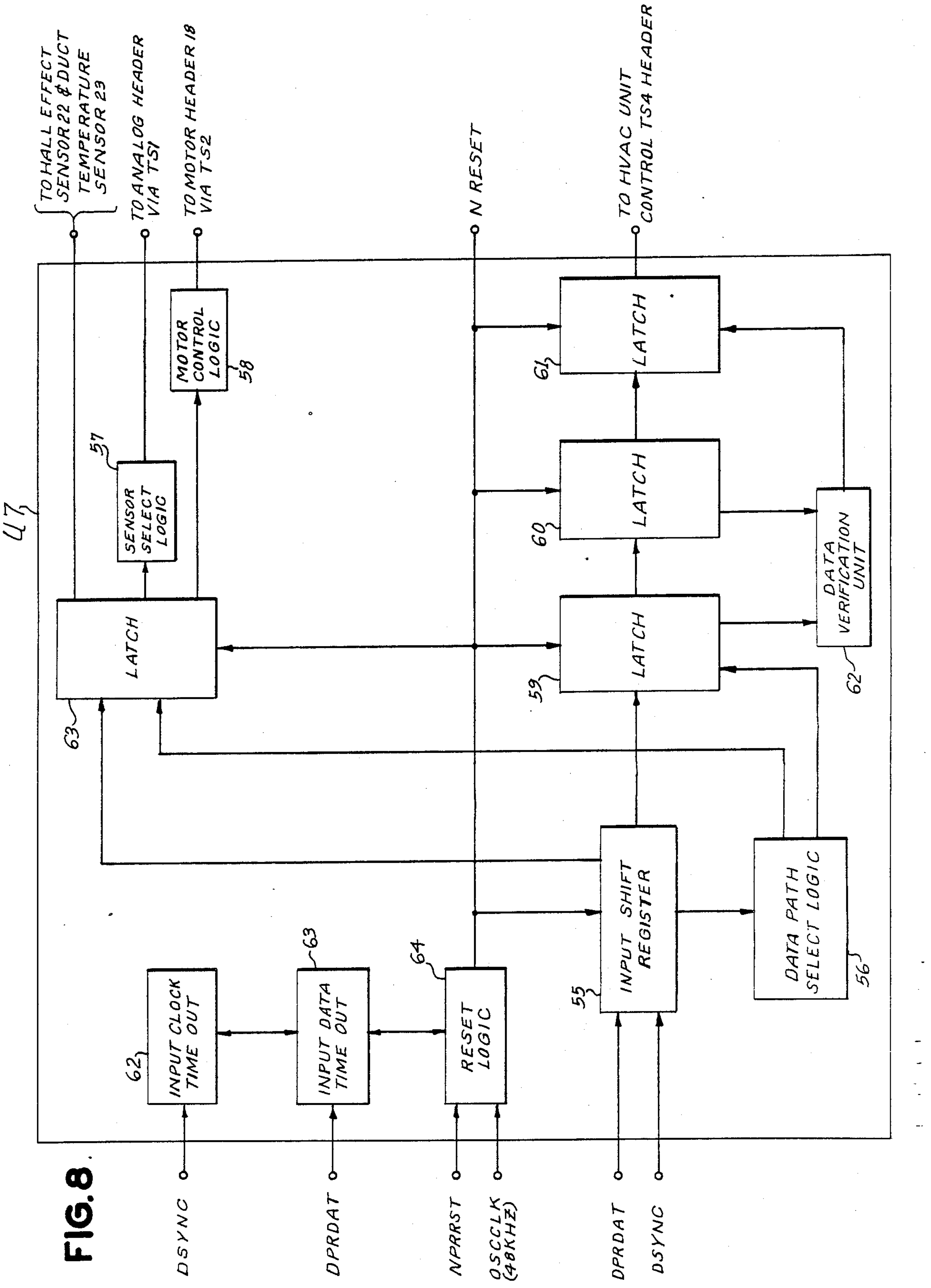
Figure 9:
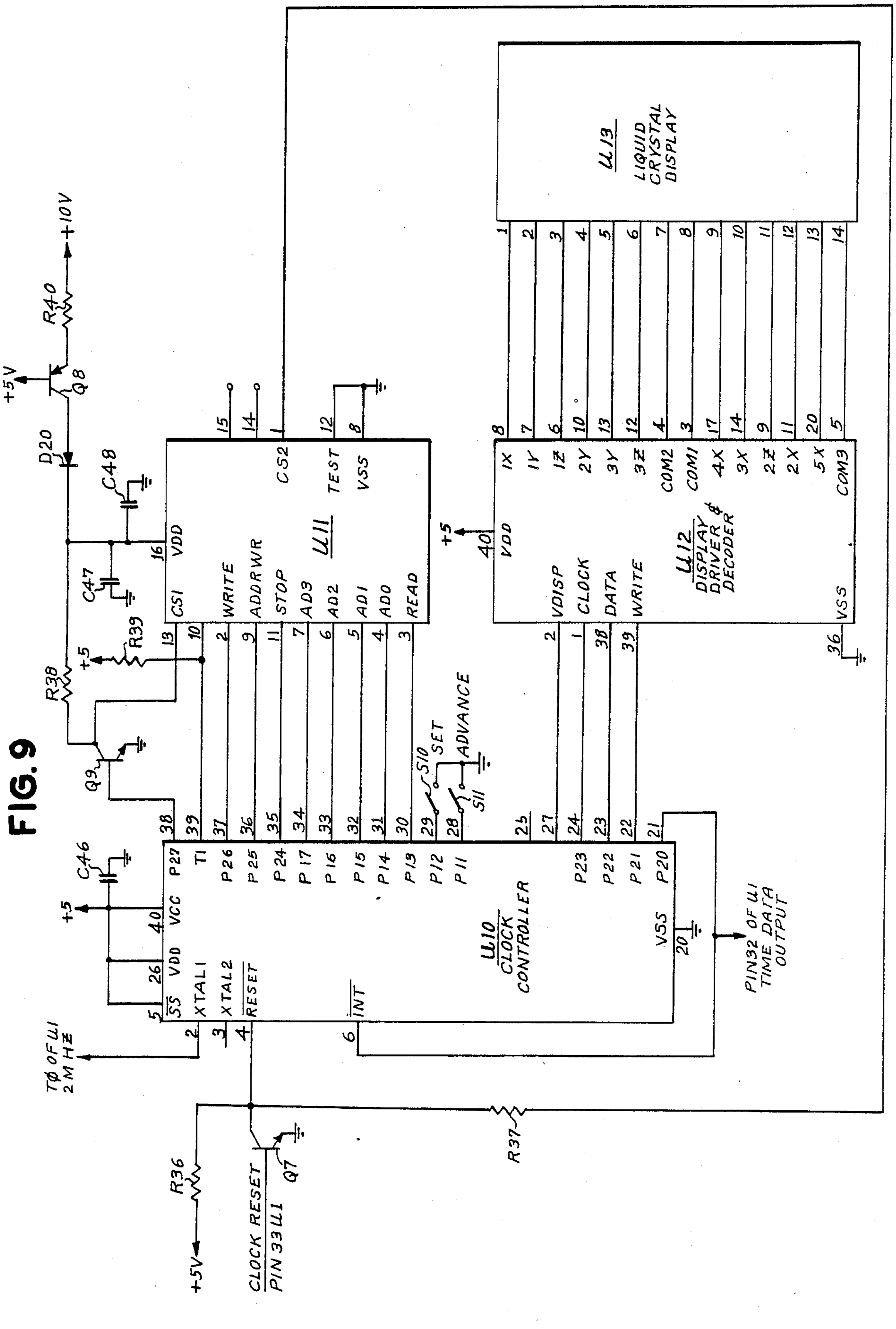

FIGS. 5SUB1 to 5SUB3 are detailed schematic diagrams of the circuitry employed in the thermostats;

FIG. 6 is a functional block diagram of the general purpose inferface used in the thermostats;

FIG. 7 is a detailed schematic diagram of the circuity of the damper control board;

FIG. 8 is a simplified functional block diagram of the central control circuit of the damper control board;

FIG. 9 is a detailed schematic diagram of the real time clock circuitry employed in the monitor thermostat.

DETAILED DESCRIPTION OF THE PREFERRED EMBODIMENT

Referring now to the drawing, a thermostat of the control assembly is shown generally at 10 in FIG. 1, thermostat 10 having a removable front cover 11 and a front display panel 12 comprising a cutout section **12*a* for viewing a liquid crystal display 13 and four resilient portions 12*b*, 12*c*, 12*d* and 12*e* for the operation of four switches located below the cover 11, and shown in FIG. 4 as switches S1 and S2** for cool setpoints "up"

and "down" respectively. In normal operation, the setpoint for initiation of the cooling function is displayed in the upper left hand section of display 13 and the setpoint for initiation of the heating function is displayed in the lower right hand section. Adjustment of the heating and cooling setpoints are made by depressing switches S1–S4 as desired.

The front cover 11 of the monitor thermostat has a cutout section 14*a* for viewing the display U13 of a real time clock 14 discussed in more detail below. It is to be noted that the slave thermostat does not includes such a cutout section 14*a* in its cover since a real time clock is not need therein, but the real time can be displayed on the display 13 beneath cutout section 12*a*.

Referring now to FIG. 2, an overview of the operation of the thermostat 10 in a HVAC system will be helpful in understanding the details hereinafter set forth. For example, four thermostats 10 are employed in a configuration of a monitor-stat 15 and three slave-stats 30, 31, 32. The monitor-stat 15 sends data to a damper control board 16 wherein control signals are generated for operation of a motor 19, via motor header 18, which controls the positioning of a damper 20. An HVAC unit 21 is controlled via HVAC control relays 17 in response to a control signal from damper control board 16. Monitor-stat 15 receives information from a real time clock 14, a zone temperature sensor 24, an outside air temperature sensor 48, a damper blade travel sensor 22, and a duct temperature sensor 23. In addition, the monitor-stat 15 transmits to and receives data from the three slave-stats 30, 31, 32 via communications bus 49.

The HVAC unit 21 supplies heated or cooled air into main duct 25 where it branches into four zone ducts 26, 27, 28, 29 and then into zones 4, 1, 2 and 3 respectively via dampers 20, 39, 40, and 41 respectively, and each thermostat 10 controls its own damper. Slave-stat 30 sends a signal to damper control 33 to operate a precision stepper motor 36 which in turn positions damper 39. Slave-stat 30 receives data from a zone temperature sensor 45, duct temperature sensor 42, and travel limit sensor 22*a*. Slave-stats 31 and 32 and their associated devices and sensors are not directly controlled but are somewhat interrelated with such devices employed in zone 1 with slave-stat 30 via monitor stat 15.

The monitor-stat 15 receives data from sensors 23, 22 and 48 via a damper control board 16. As will be discussed in more detail below, the damper control board 16 has circuitry for enabling several analog sensors which then send their signal data to the monitor-stat 15 or to slave-stats 30, 31, 32. Additional sensors, while not fully described herein, may include devices for the measurement of, for example, air pressure, air velocity and humidity.

Only the monitor-stat 15 includes a control function of the HVAC unit 21. The monitor-stat 15 receives data from its own zone and from the zones 1–3 monitored and controlled via slave-stats 30, 31, 32 respectively. In addition, the monitor-stat 15 has the real time clock 14 and data representative of the time-of-day and day-of-the-week is sent to each slave-stat 30–32 in the system from the monitor stat 15, as will be more fully explained hereinbelow.

As will be more fully explained below, a given monitor-stat 15 can itself be controlled by higher intelligence such as a computer system (not shown). Communication line 49 represents the communication network between the monitor-stat 15 and slave-stats 30–32.

Figure 4:
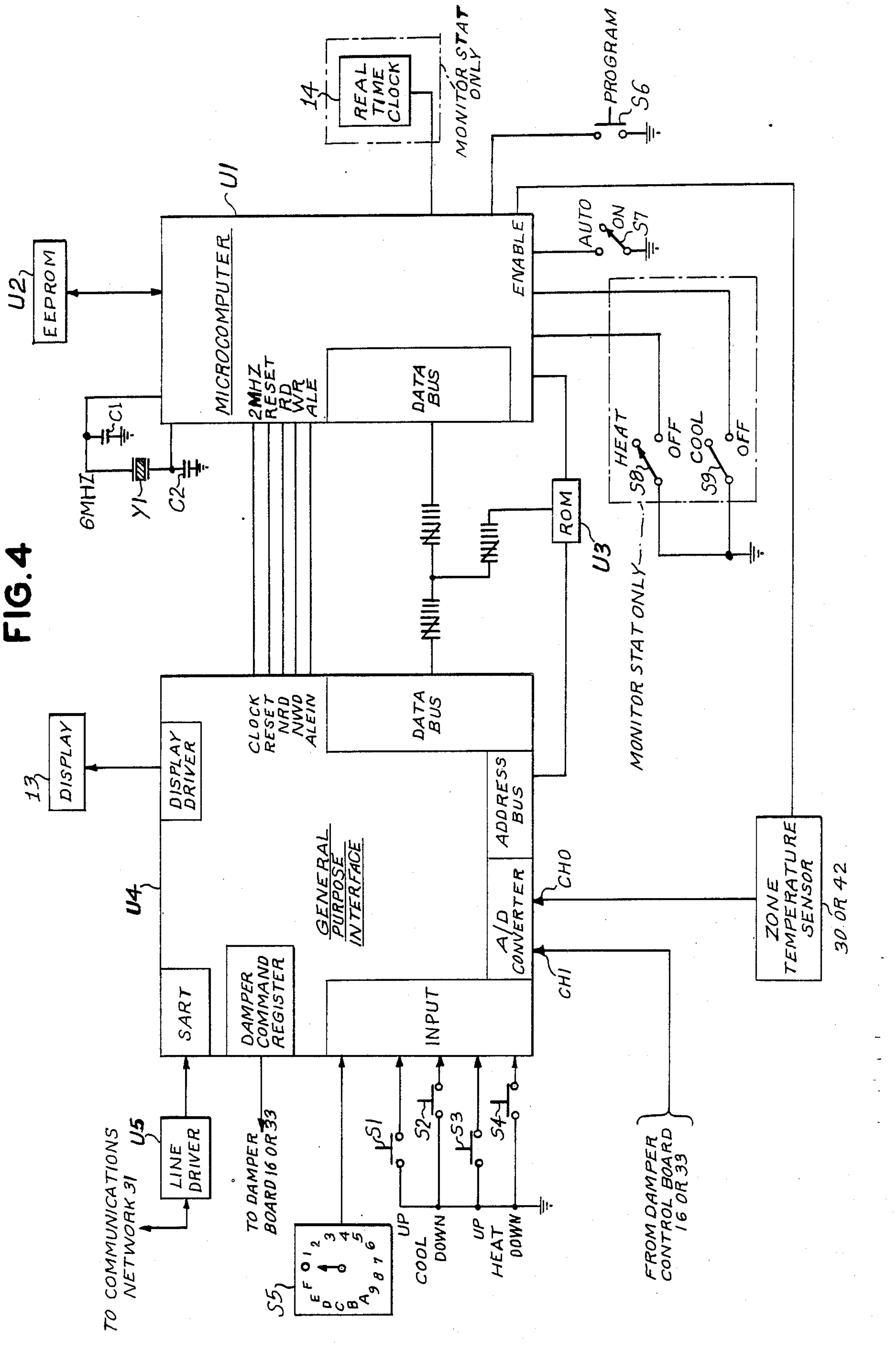
FIG. 4 is a simplified schematic diagram of the circuitry employed in the monitor and slave thermostats.

Referring now to FIGS. 3, 4, schematic diagrams of the thermostat 10 are illustrated. The thermostat electronics comprise a conventional microcomputer U1 clocked at 6 Mhz by way of crystal Y1 and capacitors C1 and C2. U1 has interal memory that is supplemented by programmable logic circuits consisting of a 256-bit electronically erasable programmable read only memory (EEPROM) U2 and read only memory (ROM) U3 which contains instruction codes and fixed data. U2 and U3 will be more fully explained hereinbelow.

General Purpose Interface (GPI) U4 provides for a number of interface circuits including a serial asynchronous receive/transmitted (SART), a 10-bit A/D converter, a liquid crystal display driver, and other logic circuits which are combined in a 68-pin integreted chip for many reasons including space, expense, and reliability. The circuits in U4 are of conventional design and a functional block diagram of the GPI U4 is shown in FIG. 6.

In the preferred embodiment of the thermostat 10, GPI U4 and microcomputer U1 are connected by thirteen lines: 8 data lines; an address latch enable (ALE); a write control ($\overline{WD}$); a read control ($\overline{RD}$); a reset line; and a clock output supplying 2 Mhz to U4.

U4 receives analog temperature data from a zone temperature detector or sensor such as 24. Each of sensors 24, 45, 46, 47, which can be located at the thermostat 10 or at a remote location in the zone, are a current source with a 1.0 ua/°K. output which is received by the A/D converter in U4. The data is then sent to U1 in digital form. Each of the sensors 24, 45, 46, 47 is enabled via a respective signal from its U1 in response to control algorithms in U3 and is sent to U4 at input "CHO" (channel 0).

As discussed above the thermostats 15 and 30–32 control respective damper 20, 39, 40, 41 by way of a precision stepper motor 19 and 36–38 and thermostat 15 activates and deactivates an HVAC 21 via control relays 17. U1 transmits an 8-bit command word into U4 where it is framed to an 11-bit word and transmitted to the damper control circuitry 16 and 33 by synchronous transmission. The transmission is clocked by way of division of the 2 Mhz clock signal received from U1 down to 9600 Hz. As explained below, the damper command word contains information which can be used to select analog signals located on the damper control board 16 or 33 for A/D conversion in U4 and also for control of a HVAC unit 23.

The monitor-stat 15 has provision for physically mounting a real time clock 14 in the housing 11. If this option is desired, a housing cover 12 will have the cut-out portion 14*a* for viewing the integral display face of the clock 14.

The damper control board 16 is illustrated in FIGS. 3, 7 and 8. U7 receives a synchronizing signal (DSYNC) and the damper control word (DPRDAT) from U4 via T8, T9 and T11. An input shift register 55 directs the word to data path select logic 56 where it is directed to HVAC unit control 17; motor control TS2 or sensor select enabling circuity TS1. The sensor select circuitry 57 is used to enable one of several analog sensors, such as outside air temperature detector 48 and others, such as, air pressure and humidity (if available). The sensor select 57 is not needed to enable duct temperature sensor 23 and damper travle limit sensors 22, 22*a*, 22*b*, 22*c*. The travel limit sensor 22 is a digital Hall effect device that provides an output when the damper blade 19*b* is at its maximum travel limit and another output when the blade is at any other position. Duct temperature and travel limit data are constantly monitored by each thermostat. The sensor select logic 57 is used to select which of the optional analog detectors, such as outside air temperature sensor 48, will be enabled. Sensor select 57 is responsive to data contained in the 8-bit damper command word. The selection between damper motor control logic 58 and HVAC relay control 17 is also based upon data in the damper command word. For reliability, the circuitry also has various watchdog and hardware redundance functions relating to hardware functioning and input clock signal integrity. Data verification logic 62 works in conjunction with latches 57, 60, 61 to provide a check of hardware redundancy. Input clock timeout 62, input data timeout 63 and reset logic 64 circuits are used with signal monitoring and reset functions.

Damper control board 16 includes opto-isolation U8 for the motor control relays to isolate inductive transients in the circuitry by isolating control power from operating power. The motor header TS2 is fed via hex inverter U9. TS2 and U9 are combined in TS2A for simplicity of illustration in FIG. 3. U7 is clocked at 48 Khz from oscillator A3. The two other amplifiers A1 and A2 in U7*a* are part of the U7 monitoring system, including power supply availability. Terminal "G" on T12 provides analog sensor data to the U4 A/D converter. As is understood in the art, electrical circuitry, associated with relays must be designed to eliminate noise and signal transients associated with relay operation such as inductive kick, contact bounce, and the like. In addition, AC signal noise must be eliminated from analog sensor signal lines. Accordingly, isolation resistors and capacitors are used throughout the circuitry, as is the case with most electronic design. Also, in the preferred embodiment of the present invention, TS3 has terminals for supplying power of additional circuits. The design approach is to supply line power to the damper control board 16 which in turn supplies the various controls used in the system via relay boards that are tailored for a specific application (e.g. single zone; multiple zone, etc.).

The real time clock 14 is illustrated in FIG. 9. The real time clock circuitry U11 contains an input from a crystal oscillator Y1 (see FIG. $5_3$) and the necessary counters, latches and so forth. Clock controller U1D reads data from U11 in response to time data request signals from microcumputer U1. The data is framed from 8-bit to 10-bit words for transmission to U1. U10 also supplies data continuously to display driver/decoder U12 where it is directed to liquid crystal display U13 for visual readout. Switches S10 and S11 are used for setting the clock controller U10 to a reference time during start-up of the system. In the preferred embodiment of the invention, capacitor C48 is a large (0.1 f) capacitance to supply U11 during power failures. "Clock Reset" is used in the time-of-day (12-hour AM/PM) and day of the week reset functions via a signal from U1.

The present invention employs the concept of firmwave engineering in the design of the thermostat 10. The basic approach is to build a single thermostat 10 that can be used with other devices in a master-slave relationship. One thermostat 10 is chosen as a master or "monitor-stat" 15 and the others are "slave-stats" 30–32. The thermostat 10 has control algorithms or programs in U3 for purposes of, among other things, transmitting and receiving data from other thermostats 10 or devices. In addition, and quite importantly, this design allows a monitor-stat 15 to operate a single zone HVAC unit 21 in a single zone mode of operation where zoning is not required and to control a damper 20 based upon information associated with its own zone in a multiple zone system.

A description of the programming and operation of the thermostat 10 will illustrate the unique features of the present invention.

PROGRAMMING THE THERMOSTAT

1. Zone Number

In order for a monitor-stat 15 to communicate with one or more thermostats 10 functioning in a slave capacity as slave-stats 32, it is necessary to establish the identity of any given thermostat 10 or device so that data can be associated with a given device.

The zone number of the thermostat 10 is established by way Cf S1–S4 and S5. S5 is a 16-position rotary switch which supplies a 4-bit binary coded decimal word to the input bus of U4. The use of a BCD word and switches S1–S4 allows for the creation of an 8-bit input word. The normal position of S5 is "0". With S5 in position "1", the zone number will be displayed on display 13. S1 can be used to raise the number, S2 can be used to lower the number. The monitor-stat 15 in any given application is always given the highest number as a matter of firmware design. The zone number is placed in EEPROM U2 via U1.

2. Single Zone or Multiple Zone Mode

The thermostat 10 can be used for a single zone thermostat or it can be used as the monitor-stat 15 in a multiple zone mode that employs a number of slave-stats 30–32. When S5 is in position "1" the display 13 will be illuminated with the word "ON" or "OFF". When the display 13 shows "OFF" the thermostat 15 is in the single zone mode and does not require data inputs from other devices in order to control the given zone. When the display 13 indicates "ON" the thermostat 10 is enabled for use as the monitor-stat 15 in a multiple zone system. Either of switches S3 and S4 can be used to toggle the function on or off. When the multiple zone mode is enabled ("ON"), firmware via U3 is used to control the system based upon data received from other sources. In either case the monitor-stat 15 is responsive to its own data being supplied by its own sensors.

3. Program Periods

A monitor-stat 15 has the capability of receiving data from a real time clock 14 by way of pins on U1. As far as the system operation is concerned, U3 instruction codes divide time into two categories. First is Period I and Period II which represent days of the week. With S5 in position "2", switches S1 and S2 can be used to raise or lower the number associated with the beginning day of Period I. Each day of the week has been assigned a number beginning with Monday=1 and ending with Sunday=7. The display 13, with S5 in "2", will show the beginning and ending day of Period I. S3 and S4 are used to set the ending day. Thus, a "2" and "6" displayed indicates that Period I is Tuesday through Saturday. The instruction codes automatically establish Period II as the remainder of the week (i.e., Sunday through Monday). A slave-stat 30–32 receives real time data from the monitor-stat 15. A slave-stat 30–32 also has time period programming identical to monitor-stat 15.

The second category of time is the time of the day. This feature employs the use of RAM in U1 and will be discussed hereinbelow.

4. Celcius/Fahrenheit Data Display

A relatively straightforward algorithm is used to allow the display to present data in either °C. or °F. The display 13 will alternate between "F" or "C" when S1 or S2 is depressed with S5 in position "3".

5. Set-up/Set-back Setpoints

In many applications it is desirable to establish heating and cooling setpoints for occupied conditions and have different setpoints for times when the zone is not occupied. Set S5 to position "4". The cooling set-up setpoint will be displayed when S1 is depressed to raise the cooling setpoint to 1° F. greater than the 66°-80° F. range set in U3. Thus, raising the cooling setpoint to 81° F. with S5 in "4" will display the set-up setpoint which can then be adjusted to any point between 81°-96° F. Similarly, adjusting the heating setpoint to below 66° F. will display the heating set-back setpoint which can be adjusted using S3 and S4 to between 50°-65° F. The programmed set-up/set-back setpoints are used in conjunction with firmware and are necessarily time dependent as will be described hereinbelow.

6. Zone Temperature Calibration

With switch S5 in position "5", switches S1 and S2 can be used to adjust the calibration of the A/D circuitry which receives signals from zone sensors 24, 45-47. The calibration is accomplished using a reference thermometer. The A/D circuit supplies a 10-bit word for the temperature (2 bits for the most significant bit, MSB, and 8 bits for the least significant bit, LSB). A 2-bit calibration word, 1 bit for MSB, 1 bit for LSB, is entered in the U2 EEPROM for use in modifying the temperature word so that the temperature reading on the display 13 is the same as that read on a reference thermometer. This data is provided to U4. A calibration word placed in U2 will modify the A/D output signal representative of temperature so that the exact temperature will be used in the circuitry. The calibration word is modified by S1 and S2 until the temperature displayed on display 13 is the same as that on the reference thermometer.

7. Duct Temperature Calibration

The system duct temperature sensors 23, 42-44 upstream of the dampers 21 and 37, respectively. With S5 in position "6", S1 and S2 can be used to calibrate duct temperature in the same manner as utilized in zone temperature calibration.

The technique utilized in the calibration of zone and duct temperature can be used with any analog sensor supplying an input to U4 with the addition of appropriate programming of U2 calibration words and instructions.

8. Ventilation and Maximum Damper Positions

The monitor-stat 15 receives data by way of driver U5 and GPI U4 SART. As will be explained in more detail below, the monitor-stat 15 determines whether the system (the HVAC unit 21 and the dampers 20, 29-41) should be in a heating or cooling mode by analyzing the demand for heating/cooling in each zone. This demand is defined as the difference between the zone setpoints and actual zone temperature. If there is not sufficient demand for heating or cooling the dampers 20, 39-41 are placed in "ventilation" mode. Set S5 to "7" and the damper ventilation mode position data will be displayed on display 13. Switches S3 and S4 are then used to set the damper 21, 37 from 0% open (Display="0") to 50% open (Display="7").

Also in position "7", the maximum open position of the damper 20, 39-41 can be adjusted using switches S1 and S2 between 100% open (Display="15") to 50% open (Display="8").

9. Setpoint Lock/Override

A unique feature of the present invention is the ability to lock the zone temperature setpoints via the system firmware. With S5 in "8", either S1 or S2 can be depressed to alternate the words "ON" or "OFF" on display 13. When "ON" is displayed at the monitor-stat 15, all zone temperature setpoints on slave-stats 30-32 are locked as set. "OFF" allows zone temperature setpoints to be adjusted at each of the slave-stats 30-32.

The slave-stat 30-32 also has provision for override of the locking feature of monitor-stat 15. By placing the slave-stat switch S5 in position "8", depressing S1 and S2 will cause the words "ON" or "OFF" to be alternately displayed at the slave-stat 30-32 and when "ON" appears, the lock feature of monitor-stat 15 is overridden at the particular slave-stat 30-32.

10. Local Setback Control and Time-Of-Day Program

Set switch S5 to position "9". The pressing of either S1 or S2 will alternate the words "ON" and "OFF" on display 13. When "ON" is displayed, a slave-stat 30-32 will operate on its own programmed set-back times. When "OFF" is displayed, a slave-stat 30-32 will operate on the setback times of the monitor-stat 15.

For the monitor-stat 15 the use of "ON" results in the monitor-stat 15 following its own set-back times as might be the case when the monitor-stat 15 is in a single zone control mode. When "OFF" appears, the monitor-stat 15 will follow time commands from another device such as a computer command center, or other device such as another monitor-stat 15.

With switch S5 in "0" the set-back times can be programmed. Program switch S6 is depressed and fan switch S7 can be placed in "auto" to represent period I (as programmed earlier, see 3. Program Periods, above). Now, if both S3 and S4 are depressed simultaneously, the last program (stored in U1) will be erased. Switch S1 is used to advance time. "ON" will be displayed in the upper left hand corner of display 13. "AM" will be displayed in the lower right hand corner. Time is advanced, hourly, until the desired hour is displayed. Either switch S3 or S4 can be depressed to indicate "OFF". S1 can then be depressed to display the time of day that setback should occur. The thermostat 10 is now programmed to follow the cooling/heating setpoints between the "ON" and "OFF" times and revert to the cooling set-up/heating set-back setpoints as previously established at the "OFF" time, i.e., when the comfort or occupied function is "OFF" the set-back feature is operative.

If switch S3 is now depressed, the word "ON" will appear and a second set-back time period can be programmed as before. Depress program switch S6 and the Period I setback times are entered.

To program for Period II, set S7 to "ON" and depress S6. Period II set-back times can now be programmed as were Period I times.

U1 in the monitor-stat 15 can receive real time data via pins P15 and P16. In addition, the use of control algorithms and switches S1–S4 and S5, S7 allows for the creation of distinct time periods: (1) Period I and Period II having to do with the days of the week; and (2) at least two distinct time periods of a given day. With the use of the real time data, the desired temperature becomes time dependent as it is now associated with a given time period. A slave-stat 30–32 receives real time data via communications bus 49.

11. Information Display

With S5 in position "A", S1 and S2 can toggle "ON" or "OFF" the Information Display option. If the display 13 is "ON" then, when both S1 and S2 or S3 and S4 are simultaneously depressed with S5 in "0" (Normal), the room temperature will be displayed (as usual) followed by time-of-day (if available), duct temperature and damper position (desired/actual), in that order. In addition, air pressure and air velocity in the ducts 26,27,28,29 can be displayed if the appropriate sensors are installed.

12. High/low Temperature Limits

The rotary switch S5 is placed in position "B". Depressing either S1 or S2 will alternate the words "GE" (for Gas/Electric) or "HP" (for Heat Pump) on display 13. The monitor-stat 15 is programmed to automatically shut down the first and/or second stages of heating or cooling if certain temperature limits are exceeded. The trip points are different for Gas/Electric or Heat Pump applications. Selection of "GE" or "HP" depends upon the type of HVAC unit 21 used.

Either switches S3 and S4 can be used to alternate "ON" or "OFF" to allow the High/Low temperature trip points to be turned on or off. The monitor-stat 15 constantly receives, preferably every 20 seconds, duct temperature data from all zones via the slave-stats 30-32. A single High or Low duct temperature reading is sufficient to activate the setpoint trip.

13. Outside Air Temperature

In systems using heat pumps it is desirable to limit set-back when outside temperature gets too cold because heat pumps become inefficient at low temperatures. Electric resistance heating can be used but is expensive. Accordingly, it might be advisable to override set-back when recovery from the set-back temperature requires electric resistance heating because the heat pump is inefficient at the given air temperatures.

In the preferred embodiment of the invention the monitor-stat 15 will override sef-back when an optional outside temperature sensor 48 indicates 30° F. or lower.

The enabling or disabling of the outside air temperature sensor function is accomplished by placing S5 in position "C" and pressing either S3 or S4 to toggle "ON" or "OFF" on the display 13.

14. System Demand

The monitor-stat 15 receives information from the slave-stats 30–32 every 20 seconds. Data received includes the heating/cooling setpoints and zone temperature. Sufficient zone demand to activate the HVAC unit 21 is defined as any zone having a temperature more than 1.5° F. from the setpoint (in the appropriate direction). The monitor-stat 15 will place the system in a heating or cooling mode depending upon the number of zones indicating sufficient zone demand. With S5 in position "C" the system demand number is displayed. Switches S1 and S2 can be used to adjust between 1 and 4 zone demands needed to establish system mode.

15. Communications Check

With S5 in position "D", the depressing of S1 or S2 will initiate a communication check between each slave-stat 30–32 and the monitor-stat 15. The zone number of each slave-stat 30–32 will be momentarily displayed along with a data word indicating whether the slave-stat 30–32 is a "cooling caller"; "heating caller"; a "cooling" or "heating" reference; or has a specific demand. The system status will be explained below in the System Operation.

16. Supplementary Heat

For a number of reasons usually dealing with the specific building construction and location, supplementary heat such as baseboard heaters might be desirable. With switch S5 in position "E", switches S1 or S2 can be used to toggle the option "ON" or "OFF". Supplementary heat works in conjunction with an outside temperature sensor 48 in a special mode of operation that need not be further discussed herein.

17. Time Guard Override

This feature involves S5 in position "F" and the toggle "ON" or "OFF" of a function to override a built-in time delay associated with cycling of the HVAC unit 21.

As can be understood from the above descriptions of the programming of the thermostat 10 and the electronic circuits involved, the approach that is used in design of the thermostat 10 allows for maximum capability of the system in which it is used. Further, the thermostat 10 needs only switch connections S8 and S9 to enable heating and cooling control in the master or monitor-stat 15 function. The programmable logic of U2 and U3 supplies the fixed data and instruction for operation of U1 as a monitor-stat 15 or a slave-stat 30–32 with the associated programmed operations.

The monitor-stat 15 controls both a damper 20 for its zone and the HVAC unit 21 supplying the system. U1 generates an 8-bit damper command word which is modified for synchronous transmission by GPI U4. In the preferred embodiment of the invention, the most significant bit (MSB) of the damper command word is different for (1) control of damper 21 or (2) control of HVAC unit 21. Switches S8 and S9 provide data inputs into U1 to assist in the creation of a MSB of the damper command word that is recognized by control circuitry 16 as that associated with the damper 20 or the HVAC unit 21. Referring now to the detailed schematic of FIG. 5 the operation of the thermostat 10 will be described more fully.

System Operation

The heating and cooling setpoints are entered into the memory of U1 via switches S1–S4 and S5 and GPI U4 as discussed above. Actual temperature in the zone associated with the thermostat 10 is derived from sensors 24, 45–47 and can be read by manually simultaneously depressing S1–S2 or S3–S4. Instructions derived from U3 will cause data representative of the actual and desired temperatures to read into U1. A comparison of the two temperatures results in the creation of a signal representative of the demand for heating or cooling or no demand in the zone. Instructions in U3 in the monitor-stat 15 predetermines that a 1.5° F. or greater difference between actual and desired temperature is necessary before there is sufficient demand to generate the signals for operation of the system in the heating or cooling mode by activating the HVAC unit 21. If there is sufficient demand, U1 will generate an 8-bit damper command word which is sent to U4 via the 8 data bus lines. The 8-bit word is framed to 11 bits for synchronized transmission to the damper control circuitry 16. The MSB of the word is recognized by the control circuitry in damper control board 16, 33–35 as being for operation of the damper 20, 39–41. After a time interval of, for example, 30 seconds which is established by code in U3, the damper command word is modified to have a MSB that is recognized by the control circuitry as being for operation of the HVAC unit 21. As before, the damper command word is transmitted to the damper control circuiry 16 which can operate the HVAC unit control circuit 17. As mentioned above, U3 code includes control algorithms for operating either a Gas/Electric or heat pump as programmed. This feature sets temperature limits for safe operation of the system and proper levels of additional heating or cooling as appropriate.

If the HVAC unit is not energized, U1 in the thermostat 10 compares actual temperature in the zone with duct temperature. The duct temperature sensors 23, 42–44 are located adjacent the inlet of the dampers 20, 39–41 supplying air to a given zone. In the preferred embodiment of the invention, the duct temperature sensors 23 42–44 send a signal to circuitry associated with damper control boards 16, 33–35. This data is received by U4 on Channel 1 (CH 1) along with other information that is developed remotely. This data undergoes A/D conversion as does the zone temperature from sensors 24, 45–47.

If the duct temperature is lower than actual zone temperature the thermostat 10 will operate the associated dampers 20, 39–41 in the cooling mode. If the duct temperature is above the actual temperature, the associated dampers 20, 39–41 are operated in a heating mode. That is to say, the dampers 20, 39–41 are operated as though the HVAC unit 21 was supplying the hotter or cooler air. Consider the case where actual temperature is below the heating setpoint with duct temperature also below the actual temperature: A. the particular zone has demand for heating but is in the cooling mode; B. accordingly, the dampers 20, 39–41 are closed; C. however, if the duct temperature was above the actual temperature, i.e., heating mode, the damper 20, 39–41 will open proportionally to the level of demand as computed by a comparison of actual zone vs. setpoint temperatures.

If the demand for heating or cooling is 1.5° F. or greater, the monitor-stat 15 will activate the HVAC unit 21 as desired. A damper command word is generated, for example, cooling, and the dampers 20, 39–41 are plaçed in the cooling mode regardless of the duct temperature comparison discussed above. If the zone has an actual temperature below the heating setpoint, the dampers 20, 39–41 will be closed in anticipation of activation of the HVAC unit 21 in the cooling mode. If the actual temperature is above the cooling setpoint, the dampers 20, 39–41 will be positioned open. U1 in monitor-stat 15 now generates an output damper command word for activating the HVAC unit 21 in the cooling mode.

If the monitor-stat 15 is operating in the multiple zone mode, instruction codes in U3 will not generate the damper command words for operating the dampers 20, 39–41 and HVAC unit 21 unless the number of zones with 1.5° F. or more demand in a given mode is equal to or greater than the system demand number that has been selected as discussed above.

The monitor-stat 15 also uses duct temperature directly to determine if additional stages of heating or cooling are required in a given mode. For example, if duct temperature is not below 55° F. when the system is in a cooling mode, the damper command word will contain information that will cause HVAC control circuitry 17 to energize an additional stage of cooling. The additional heating or cooling functions derive from codes in U3. Finally, duct temperature is used directly for high/low temperature trips of the HVAC unit 21 for safe system operation.

1. Communications

In the preferred embodiment of the present invention, the SART in GPI U4 is used for communication with peripheral circuits. Input data from the SART and data switches S1–S4 and S5 is placed in registers in U4 which can be read by U1. U4 also contains an 8-bit address bus for accessing microcode in U3.

Collision avoidance for the communications network 31 is accomplished by load resister R6 which monitors the current required by line driver U5. Q3 is turned on by line current through R6 and an Interrupt ($\overline{INT}$) signal is placed on pin 6 of U1. Capacitors C5 and C6 filter noise which might otherwise result in false collision detection indications.

2. Watchdog Functions

U4 also performs watchdog functions to insure proper operation of the thermostat 10. A voltage divider of R15 and R16 applies a signal to pin 57 of U4. When and if the voltage is too low, U1 is disabled by a signal on the reset line between u1 and U4. U4 also receives timing data from U1. If the proper timing data is not received, U1 will be disabled via the reset line.

3. Digital Functions

An important feature of the thermostat 10 is the exclusive use of all data in digital form. For example, the heating and cooling setpoints are entered into U4 by switches S1–S4 and S5. The SART in U4 also places incoming information on the same registers used for setpoint input. As mentioned above, firmware in conjunction with the programming allows for setpoint lock from the monitor-stat 15 to a slave. Further, there is provision at the slave-stat 30–32 for override of the remote setpoint lock feature. This is made possible by the use of digital data format.

Also, analog temperature data is converted into digital form in the A/D converter in U4. The digital form allows for calibration of the data by way of the software because each temperature interval is a binary word. A calibration binary word can be placed in U2 for calibration using S5 in position "5" or "6". Similarly, other remote data can be accessed by the thermostat 10. Data in analog form can be enabled via the instruction codes and converted to digital form in U4. For example, in the preferred embodiment of the thermostat 10, various analog data is accessed by way of the damper control circuitry 16, 33–35. By modification of the damper command word, different remote data can be enabled and received at CH 1 of U4. Because the enabling was done via U1 command word generation, the incoming data is easily identified and properly processed.

The use of digital data allows for the transmission of any information at a thermostat 10 to any higher intelligence as well as the reception of data for processing and control. Also, the thermostat 10 has internal diagnostics and system failures can be identified by data presented on display 13. For example, failures having to do with the setback setpoints is identified as "SF 2". A hardware failure might be "HF 16": zone temperature sensor out of range.

Finally, real time data can be received by monitor-stat 15 in digital form. This data can be transmitted by way of U4 SART for supplying data representative of time to other peripheral circuits such as a slave-stat 30–32. This function is used in the set-up/set-back setpoints and time periods as discussed above. Also, because of the digital nature of all data, the time inputs may be simply "ON" or "OFF" signals derived from an electro-mechanical timer using simple relay contacts that are either opened or closed at a given time.

Liquid crystal display 13 is a conventional tri-plexed display driven by U4 and used for local indicating means for data display.

If the monitor-stat 15 has been programmed for multiple zone use, the level of demand from each zone is read by receiving the actual deviation of room temperature from setpoint temperature. In the preferred embodiment of the invention, all thermostats 10 are specifically designed to compute the level of demand rather than simply exchange a "YES" or "NO" signal. This feature allows the monitor-stat 15 to compare the level of demand in each zone and select the zone with the greatest demand as the reference zone. Other thermostats 10 are heating callers" or "cooling callers" if demand for heating or cooling exists in the given zone. The thermostat 10 will operate the HVAC unit in the appropriate mode until the reference is within 0.5° F. of the setpoint. For example, the system demand number may be "3" thus requiring 3 zones to have a similar demand for heating or cooling before the heating or cooling mode is selected but the mode once selected will remain in effect until the reference zone is satisfied. A new reference zone will be chosen if a zone develops a greater demand than the first reference during operation in a given mode.

Once the reference zone is within 0.5° F. of the setpoint, the monitor-stat 15 will generate the appropriate damper command word to deactivate the HVAC unit 21 via HVAC control circuit 17. Assume that cooling was being supplied and the HVAC unit 21 is deactivated. The duct temperature at each zone will be below actual temperature. Thus, the comparison between duct and zone temperature will result in the monitor-stat 15 placing its damper 20 in the cooling mode. As a matter of design, each slave-stat 30–32 will also position its damper 39–41 in the cooling mode.

With the HVAC unit 21 deactivated, duct temperature will gradually increase. If duct temperature rises above zone temperature, the thermostat 10 will operate its damper in the heating mode. As a matter of design, the heating and cooling setpoints are established by U3 to be within 65°–80° F. If duct temperature is within the range 65°–80° F. and there is no demand or demand different from the mode created by the duct/actual comparison, the dampers 20, 39–41 placed in the ventilation mode. In the above example, where cooling was being supplied, the dampers 20, 39–41 will remain in the cooling mode because actual temperature will probably be above the cooling setpoint due to the ambient heat sources that caused temperature to increase in the first place.

In the preferred embodiment of the present invention, power is directed to a thermostat 10 from its respective damper board 16, 33–35 via a 12-conductor ribbon having terminals T1–T12 for power input and communications therebetween. Voltage regulator U6 is a conventional device for supplying a regulated +5 vdc to various circuit points. Another voltage of +9.3 vdc is also supplied from damper boards 16, 33–35. As is understood in the art, the completed circuit illustrated in FIG. 5 comprises filter capacitors and resistors for signal isolation and noise suppression and the like. Terminals T11 and T12 are the connection points used if zone temperature sensors 24, 45–47 are located in the zone instead of physically connected to the housing all of the thermostat 10. Transistors Q1, Q2 and associated components are used to enable the sensors 24, 45–47.

In accordance with the present invention the thermostat 10 can be used in the capacity of a monitor-state 15 which essentially controls the system with a number of slave-stats 30–32 or as a monitor-stat 15 which is controlled by higher intelligence. The monitor-stat 15 controls its own zone conditions and the conditions in each other zone is controlled via a slave-stat 30–32. Each thermostat 10 operates dampers 20, 39–41 in the ducts 26–29 that directs air into the zone. The monitor-stat 15 can also control an HVAC unit 21. Importantly, the monitor-stat 15 can operate in a single zone mode without a damper 20 by simply controlling the operation of an HVAC unit 21.

The major distinctions between a thermostat 10 used as a monitor-stat 15 and as a slave-state 30–32 are (1) the monitor-stat 15 has the instruction codes and data in U3 for operation as a master controlling device; (2) the monitor-stat 15 has provisions for a real time clock input data and the programming to make use of such data; (3) the monitor-stat 15 has heat switch S8 and cool switch S9 for operation of an HVAC unit 21; and (4) the monitor stat 15 has additional programming capability due to codes stores in U3. These features allow the monitor-stat 15 to receive, process and transmit information to one or more slave-stats 30–32. In addition, the monitor-stat 15 can receive and transmit information to higher intelligence. Thus, a plurality of monitor-stats 15 each associated with its own HVAC unit 21 and a group of slave-stats 30–32 may be under control of a central computer system. Furthermore, because a monoitor-stat 15 can operate in a single zone mode as well as in multi-zone mode, there is virtually unlimited flexibility in overall system design for use of such thermostat 10.

The features of the thermostat 10 used respectively as a monitor-stat 15 and a slave-stat 30–32 are as follows:

Each thermostat 10 is programmed for zone number; programming periods; °C. or °F. display; set-up/set-back setpoints; calibration of zone temperature sensor; calibration of duct temperature sensor; and damper travel limits/ventilation mode travel limits. The monitor-stat 15 can be programmed to lock slave-stat 30–32 setpoints; the slave-stat 30–32 can be programmed to override this lock feature. The slave-stat 30–32 can be programmed to follow the set-back times of another device or to follow set-back times programmed at the slave-stat 30–32. The monitor-stat 15 may be programmed to follow its own set-back times or to follow those of a higher intelligence. The monitor-stat 15 alone has the following programmable features: (1) the high/low temperature limits set in U3 are made operational by establishing that the HVAC unit 21 in use is Gas/Electric or Heat Pump; (2) the system demand number; (3) the communication check feature; and (4) the supplemental heat/time guard override features. The monitor-stat 15 alone also has the capability to receive real time data directly and such information can be transmitted to all slave-stat 30–32 via the SART in the monitor-stat 15.

The general design of the thermostat 10 employs digital words and programming to accomplish the various tasks. The characterization of the thermostat 10 as a monitor-stat 15 or slave-stat 32 is done by way of the instruction codes in U3 and, in the case of the monitor-stat 15, the addition of "heat" switch S8 and "cool" switch S9 to U1 and the provision for a real time clock input signal to U1 from clock 14.

The system employs a first circuit subsystem comprising switches S1–S4 and S5 which provide 8-bit digital words into U4 for establishing the desired operating limits, such as temperature setpoints. In addition, switches S1–S4 and S5 are used in the programming of the thermostat 10 by providing digital words to EEPROM U2 and accessing digital words contained in U2 for use in sensor calibration; for establishing the minimum and maximum damper position in a given mode (ventilation, heating, cooling); and for establishing the applicability of the high and low temperature trips for given type of HVAC unit 21 (Gas/Electric or Heat Pump).

A second circuit subsystem receives sensor data indicative of the actual condition of the air in a zone (temperature, pressure velocity, etc.) and such data is received directly by U4 in the case of actual temperature and indirectly from the damper control circuitry 16, 33–35 with regard to duct temperature, and, if needed, air pressure, velocity, humidity, and outside air temperature. The A/D converter in U4 will provide a 10-bit digital word output that is representative of the analog data received from such sensor.

A third circuit subsystem represented by microcomputer U1, receives digital word inputs from U2 and U4 that represent programmed data and actual data with regard to the operating conditions of a given zone. U1 will provide a digital word output in response to data received from U2, U4 and its own RAM for operating the dampers 20, 39–41 and, in the case of the monitor-stat 15, for operating the HVAC unit 21.

A fourth circuit subsystem represented by the programmable logic of U3 and U2 provides digital word data to U1 for controlling the dampers 20, 39–41 and/or the HVAC unit 21.

In accord with this invention, there are some overlaps of the first, second, third and fourth circuit subsystems for reasons of simplicity, cost and reliability. For example, the RAM in U1 is used in programming the time-of-day associated with set-up/set-back setpoints in conjunction with S6 as a matter of convenience while EEPROM U2 is used for (1) device address/zone number; (2) standard setpoints; (3) setback setpoints; (4) open/close damper travel limits; (5) setback programs, periods I, II; (6) zone temperature calibration words; (7) various options such as (a) lock/override; (b) HVAC type; (c) temperature readout selection in °F. or °C.; and (d) local or remote setback control. This particular circuit combination allows the user to change the time-of-day associated with setback without accessing U2 via S5 and thus inadvertently altering the programs established by the installer of the thermostat 10. In the preferred embodiment of the invention, a physical barrier is placed over S5 which should be removed only by an installation technician to minimize such alterations.

In the preferred embodiment of the present invention, second temperature sensors 23, 42–44 are used to measure duct temperature. The sensors are placed upstream of the dampers 20, 39–41 supplying a given zone. The analog signal is sent from the damper control boards 16, 33–35 to the A/D converter in U4 via CH 1. U4 provides a digital word output representative of the duct temperature. U3 contains instructions which cause U1 to compare the digital word received from U4 representative of actual temperature with the digital word, also from U4, representative of duct temperature. The result of the comparison in U1 is then used, in conjunction with instructions in U3 regarding mode, to determine the desired mode of operation of the dampers 20, 39–41, i.e., heating or cooling. The instructions contained in U3 are written to allow time, about 30 seconds, for operation of dampers 20, 39–41 prior to activation of a HVAC unit 21. In addition, the dampers 20, 39–41 are placed in a mode coincident with that of the HVAC unit 21. Accordingly, digital words indicative of the status of the HVAC unit 21 as well as the desired status of the unit 21 (i.e., desired mode) are generated and supplied to a slave-stat 30–32 via the SART in U4. In the case of a monitor-stat 15, U1, of course, generates the desired mode digital words itself by a comparison of duct and actual temperature of its own zone for its own use in addition to transmitting the digital words to various slave-stats 30–32 via the U4 SART. The monitor-stat 15 may cause the energization of additional stages of heating or cooling if duct temperature does not reach a predetermined point within a given time interval of about 5 minutes after the HVAC unit 21 is activated in a given mode. The predetermined duct temperature limits associated with additional HVAC unit 21 stages of heating and cooling are contained in U3. HVAC unit 21 type data is contained in U2 in the form of digital words so as to allow for additional stages of HVAC unit 21 operation to be activated taking into account whether a Gas/Electric unit or a Heat Pump unit is being used in the system. Similarly, U3 contains high/low temperature trip points in the form of digital words. In the preferred embodiment of the invention, U3 in the monitor-stat 15 contains high/low trip point data to deactivate additional stages of heating or cooling: first, if a given trip point setpoint for these stages is exceeded, the entire HVAC unit 21 is deactivated; and if an additional set of high/low trip points are exceeded by operation of the units' primary stages of heating or cooling. The digital word data representative of HVAC unit 21 status thus include data regarding which of the stages of heating or cooling are energized.

U3 contains instructions for operating the zone dampers 20, 39–41 in the heating mode when the duct temperature is greater than the actual zone temperature and operating the zone dampers 20, 39–41 in the cooling mode when duct temperature is lower than actual zone temperature. Instructions in the form of digital words are also present in U3 for generation of a damper command word by U1 that is sent to the monitor-stat's damper control system 16 and to all slave-stats 30–32 for placing the dampers in the mode coincident with the decision made at the monitor-stat 15 for operation of the HVAC unit 21 prior to activation of the HVAC unit 21.

U3 contains instruction codes for placing the dampers 20, 39–41 in the cooling mode, heating mode, or ventilation mode when the HVAC unit 21 is de-energized by causing U1 to compare duct temperature with actual temperature; actual temperature with desired temperature; and duct temperature with predetermined setpoints (contained in U3). Thus, as described above, if there is no demand in a given zone or a demand different than that computed by a comparison of duct and actual temperature and duct temperature is within the range 65°–80° F., the monitor-stat 15 or slave-stat 30–32 will place its damper 20, 39–41 in the ventilation mode.

Any digital word data at any thermostat 10 can be transmitted via the SART to any other device. Thus, for example, the monitor-stat 15 will receive duct temperature data from every duct temperature sensor 23, 42–44 in the system. The monitor-stat 15 receives duct temperature data directly via its own damper board 16 and the A/D converter in U4. Duct temperature data in the form of a digital word will be received from each slave-stat 30–32 via the slave-stat 30–32 SART. Accordingly, the monitor-stat 15 need not have the capability of processing a large number of duct temperature analog signals through its own A/D converter in U4, and this greatly simplifies the design and programming of a given monitor-stat 15.

The thermostat 10 employs a conventional tri-plexed liquid crystal display 13 that can display data indicative of the information contained in any digital word data used in the thermostat 10. Furthermore, the monitor-stat 15 has a display 13 and appropriate instruction codes in U3 to allow such display to provide information received from any slave-stat 30–32.

Turning now to several of the important features of the thermostat according to the invention, an important part of the operation of thermostat 10, as either a monitor-stat 15 or slave-stat 30–32, is the use of a serial asynchronous receiver transmitter (SART) contained in U4. In the preferred embodiment of the invention, the SART is similar to a universal asynchronous receiver transmitter (UART) which is restricted to only operate at a restricted number of data rates and a universal type is not needed in the particular application.

One use of the SART in a slave-stat 30–32 is the reception of a digital word from the monitor-stat 15 that prevents the temperature setpoints at the slave-stat 30–32 from being changed locally. A 2-bit word is placed in EEPROM U2 at the slave-stat 30–32 and prevents the setpoints entered therein from being altered via switches S1–S4 at the slave-state 32. As mentioned previously, the locking feature override can be enabled locally by entering a 2-bit word into U2 via switches S1–S2 and S5 in position "8", the 2-bit words are used to enable or disable the setpoint lock feature.

In the preferred embodiment of the present invention, a monitor-stat 15 is designed to receive information from up to 63 slave-stats 30–32 without the addition of communication bus extender circuitry. Each slave-stat 30–32 sends the following information to the monitor-stat 15 at approximately 20 second intervals: zone temperature; zone setpoints for heating and cooling; zone damper position; thermostat mode (heating or cooling); zone address number; and duct temperature. (Damper position can be derived from the signal that a thermostat 10 supplies to the damper control circuitry or from damper position-indicating circuitry that need not be discussed further in this application).

The input from a real time clock 14 is received by a slave-stat 30–32 via its SART. This is a 10-bit word. Program periods I and II are stored as data in U2 as are the setback setpoints. Time-of-day program data is stored in the U1 RAM. The 10-bit digital word representative of real time is read into U1 which accesses instructions from U3 to modify the operation of the slave-stat 30–32 in accordance with time related or programmed periods. Thus, the slave-stat 30–32 will access setback setpoints from U2 instead of the normal setpoints (also in U2) in response to the appropriate real time digital words received from a monitor-stat 15. Also stored in U2 are the digital words for local (slave-stat) or remote (monitor-stat) setback control, as discussed hereinabove.

Data is preprogrammed in U3 for providing the dedicated set-up setpoints of 81°–96° F. and the dedicated set-back setpoints of 50°–65° F. around the normal setpoint range of 66°–80° F.

The thermostats 10, whether used as a monitor-stat 15 or slave-stat 30–32 receive data from sensors, including sensors 24, 45–47, 23, 42–44 in analog form, and such signals, representing zone temperature and duct temperature, are converted to digital form via the A/D converter in U4. When calibrating the temperature sensor signals, 2-bit calibration words are placed in EEPROM U2 via switches S1 and S2 with S5 in "5" (for zone temperature) or "6" (for duct temperature). S1 or S2 is depressed to raise or lower the temperature displayed at Display 13 to readout what the exact temperature is as measured by a reference device, like an accurate thermometer. Once set, the calibration words are placed in U2 and, when U1/U3 instructions call for enabling a sensor to provide temperature data, the calibration word is sent to A/D converter in U4 which modifies its output to provide a 10-bit word to U1 that is the exact, calibrated temperature. This procedure is unique in that the usual methods used for temperature calibration involve either a modification of the temperature detector's output signal or the modification of instrumentation circuitry. In the present invention, calibration is accomplished by modification of the digital word representative of the temperature data, the digital word then being sent to U1.

U3 contains a straightforward algorithm for conversion of temperature data to readout in °F. or °C. on Display 13. With S5 in position "3" S1 or S2 can be depressed resulting in the input into U4 of a digital word that is then placed in U2. U1, in accordance with the algorithm in U3, will compute temperature in °F. or °C. when instructed to do so via the word placed in U2 that was placed therein during programming.

The programs in U3 become time-dependent with proper program inputs and the addition of a real time input signal to U1 of the monitor-stat 15 via clock 14. Real time is transmitted to the slave-stats 30–32 via the SART in monitor-stat 15. The receipt of the time data is used to switch from the setback or non-occupied time periods and the normal or occupied time periods established during the original programming. In addition, the slave-stats 30–32 can be programmed to follow the setback times of the monitor-stat 15.

The thermostat 10 in accord with the present invention has instructions and fixed data stored in U3. The information is placed in U3 in the form of machine code.

The programmable master thermostat or monitor-stat 15 sends data to and receives data from slave-stats 30–32 and may exchange data with higher intelligence. The methods employed in controlling the system involve generally the receipt of information by the monitor-stat 15 regarding the actual and desired condition of its zone and similar data via the slave-stats 30–32. The system demand number is the number of zones that must demand heating or cooling prior to activation of the HVAC unit 21 in the appropriate mode. The actual number of zones demanding heating or cooling is compared by U1 in the monitor-stat 15 with the preselected system demand number and the selection of the appropriate HVAC 21 operation is made according to the programming of the monitor-stat 15. The monitor-stat 15 then transmits a damper command word to its damper board 16 for placing its damper 20 in the appropriate mode and transmits via its SART data regarding the chosen HVAC mode to each slave-stat 30–32. Each slave-stat 30–32 receives the HVAC mode data via its SART and generates its damper command word for operating its respective damper 39–41 in the appropriate mode. The slave-stat 30–32 has programming in its U3 ROM to operate its damper 39–41 in a mode coincident with the desired mode of the HVAC unit 21 regardless of the programs contained in U3 for operation of the damper 39–41 in accordance with the demand for heating or cooling in their respective zone 1–3. If the cooling mode had been selected for a given damper 20, 39–41 and cooling has been selected for the mode of the HVAC unit 21, the dampers 20, 39–41 will be positioned fully open. The other dampers 20, 39–41 will be positioned closed if the zones have no demand or demand for heating. The programmable master thermostat 15 will then activate the HVAC unit 21 in the appropriate mode.

The programmable master thermostat 15 constantly receives duct temperature data from all the duct temperature sensors 23, 42–44 and if the duct temperature is not within preselected limits established by monitor-stat 15 within a given time period the monitor-stat 15 has a program for transmitting a signal to its damper control board 16 for increasing the heating or cooling of the HVAC unit 21 by activating additional stages in the HVAC unit 21. In addition, the programmable master thermostat 15 has predetermined setpoints to deactivate the HVAC unit 21 is duct temperature from any sensor 23, 42–44 exceeds certain high and low trip points.

Each thermostat 15, 30–32 is determined by the programmable master thermostat 15 to be a "heating caller" or "cooling caller" if it has demand for heating or cooling, respectively. The zone 1, 2, 3, 4 that has the greatest demand is chosen by the monitor-stat 15 as a "reference zone" associated with a selected mode of operation of HVAC unit 21. The reference zone is chosen as part of the program for arbitration in the event of a tie between the number of zones calling for heating and cooling. In addition, the use of a reference zone allows the programmable master thermostat 15 to operate the HVAC unit 21 until the reference zone is satisfied. Because the zone with the greatest demand may remain as the zone with the greatest demand due to location and usage, the use of a reference zone will prevent excessive cycling of the HVAC unit 21. Further zones may be chosen as new reference zones depending on their demands while the HVAC unit 21 is operating in a given mode. This program in the monitor-stat 15 also prevents excessive cycling of the HVAC unit 21.

During operation of the HVAC unit 21 in a given mode, each programmable thermostat 15, 30–32 will modulate its own damper 20, 39–41 between the open and closed position depending upon the demand for heating or cooling in a given zone 1–4.

If a given zone 1–4 has no demand or a demand different from that which would result from a comparison of actual temperature and duct temperature when the HVAC unit 21 is deactivated, the given zone thermostat 15, 30–32 will operate its damper in the ventilation mode provided its duct temperature is within a programmed band of 65°–80° F. set into U3. The ventilation mode is used both for normal ventilation air changing as well as a mode of operation during transition of the zone demand from one demand to the other.

The programmable master thermostat 15 can receive real time data via U1 and in the preferred embodiment of the invention, a real time clock 14 is included within the monitor-stat 15. In actual operation, the entire system will be time-based according to the programming in the thermostats 15, 30–32 and the clock 14. The programmable master thermostat 15 transmits real time data to the programmable slave thermostats 30–32 for use in operating the thermostats 30–32 according to the setpoints for the appropriate time period. Each zone thermostat 15, 30–32 can be individually programmed for appropriate time periods and setpoints.

As a matter of the system design, a programmable master thermostat 15 can exchange data with higher intelligence such as a computer or another monitor-stat 15. In such a configuration, only one clock 14 will be used in the system.

Each zone thermostat 15, 30–32 can operate up to four dampers 20, 39–41 via the damper control boards 16, 33–35 (one damper board per damper). Multiple-damper control would be used if a single damper 20, 39–41 cannot supply sufficient air flow to a given zone 1–4. In general, a monitor-stat 15 can control 63 slave thermostats 30–32 without the need for expanded communications circuitry.

The following is an example of a 2-Zone System operating sequence. A cooling example is used. The time is 8 AM, the outside temperature is 80° F., and both thermostats 15,30 have cooling setpoints of 74° F. The monitor-stat 15 has a room temperature of 75.5° F., which means a demand for 1.5° cooling. The slave-stat 30 has a room temperature of 76° F. . . . a demand for 2° cooling. It takes a demand of 1.5° or greater to start a cooling cycle. Since the slave-stat 30 is the zone of the greatest demand, it is chosen as the reference thermostat.

Now that a reference has been chosen, the system sets all thermostats 15, 30 into the cooling mode. The zone dampers 20, 39 begin to modulate open to prepare for the cooling cycle. After the zone dampers have reached their final positions, the monitor-stat 15 energizes cooling at the HVAC unit 21. Zone 4, with the monitor-stat 15, begins to satisfy faster than the slave-stat 30. As the room temperature drops and demand becomes less than 1.5°, the monitor-stat 15 begins to modulate its damper 20 toward the closed position. The reference slave-stat 30 still has over 1.5° demand which keeps cooling on. Room temperature at the monitor-stat 15 is now equal to setpoint and its zone damper 20 has been closed. Demand at the slave-stat 30 is now less than 1.5°. However, since it is the reference thermostat, the cooling cycle will continue until the reference is within ½° of setpoint and the zone damper 29 is kept in the full-open position. The slave-stat 30 is now within ½° of setpoint. Although the monitor-stat 15 has a slight cooling demand, and its zone damper is modulated partially open, cooling is turned off since there isn't enough demand to keep the HVAC unit energized.

With residual cooling in the duct, the zone thermostats 15, 30 assume the cooling mode since a comparison of duct and room temperatures show duct temperature being colder than room temperature. Zone dampers 20,29 modulate proportionally to their zone thermostat cooling demand. As duct temperature warms above room temperature, the zone thermostats 15, 30 switch to the heating mode. Since they have a cooling demand and the duct temperature is between 65° and 80° F., the zone thermostat 15, 30 now operates in the ventilation mode. The zone dampers 20, 29 are positioned to the minimum ventilation damper position. When zone temperature at any thermostat 15, 30 rises to create a 1.5° cooling demand, the system chooses a reference thermostat and another cooling cycle begins.

The monitor-stat 15 periodically receives real time information from clock 14 which the monitor-stat 15 transmits to all slave-stats 30–32 in addition to using the information itself. At the time of setback which was programmed earlier, each thermostat 15, 30–32 will operate according to its setpoints for the particular period.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method for controlling the positioning of a plurality of dampers of zone duct damper means prior to activating a single zone HVAC unit that supplies heated or cooled conditioned air through a single duct system having duct damper means and ducts to a plurality of zones and zone thermostats associated with respective dampers, said method comprising the steps of:

A. determining the demand for heating or cooling from all zone thermostats;

B. determining the number of zones having a demand for heating or cooling from all zone thermostats;

C. selectively preselecting the number of zones having demand for heating or cooling that is necessary to select the heating or cooling mode;

D. comparing the numbers obtained from steps B and C and selecting the heating or cooling mode when the number of zones having a demand for heating or cooling respectively is equal to or greater than the number selected in step C;

E. activating appropriate dampers to closed position if the zone thermostats controlling such appropriate dampers have no demand or demand a mode different than the mode selected in step D, and positioning open the other dampers;

F. activating the HVAC unit in the selected mode until all zone thermostats demanding the selected mode have been satisfied;

G. deactivating the HVAC unit; and

H. repeating steps A–G for the other mode when demand for the other mode has been selected in accord with steps A–D.

2. The method of claim 1 wherein step E includes the step of:

I. activating some of the other dampers to a partially open position depending upon the amount of demand by their respective thermostats and modulating such dampers between open and closed until the demand is satisfied.

3. The method of claim 1 further comprising the step of:

I. comparing the number of demands after steps A–D and if the demands for heating and cooling are equal, the HVAC unit will be activated in step F in the mode coincident with the demand of the zone with the greatest demand.

4. The method of claim 3 further comprising the step of:

J. modulating between open and closed positions the zone dampers according to the respective control of the zone thermostats when there is insufficient demand to require activation of the HVAC unit in the heating or cooling mode by the zone thermostats from steps A–D.

5. The method of claim 4 wherein the respective control of the zone thermostats in step J includes the steps of:

K. determining the zone temperature;

L. determining the duct temperature; and

M. comparing the zone temperature to the duct temperature and (1) when the duct temperature is warmer than the zone temperature, the thermostat operates the zone duct damper in the heating mode and substantially opens the zone duct damper upon the thermostat sensing a zone demand for heat when the zone temperature is a predetermined amount below set point and substantially closes the zone duct damper upon the thermostat sensing no zone demand or a zone demand for cooling, and (2) when the duct temperature is cooler than the zone temperature, the thermostat operates the zone duct damper in the cooling mode and substantially opens the zone duct damper upon the thermostat sensing a zone demand for cooling when the zone temperature is a predetermined amount above set point and substantially closes the zone duct damper upon the thermostat sensing no zone demand or zone demand for heat.

6. The method of claim 4 wherein the respective control of the zone thermostats in step J includes the steps of:

K. determining the zone temperature;

L. determining the duct temperature; and

M. comparing the zone temperature to the duct temperature and (3) when there is no demand for heating or cooling in a zone or a demand different from that derived from a comparison of duct temperature and zone temperature in (1) or (2) and duct temperature is within predetermined limits, the zone duct damper is operated in the ventilation mode.

7. A method of monitoring and controlling the condition of air within each of a plurality of zones being supplied with heated or cooled conditioned air from a single zone HVAC unit via a single duct system having zone ducts and zone duct damper means therein wherein one zone damper means and the HVAC unit is controlled by a programmable master thermostat, said method and the other zones are controlled by programmable slave thermostats comprising the steps of:

A. setting the setpoint of each of the zone thermostats to a level for the respective zones;
B. monitoring the demand for heating or cooling from all zone thermostats by the programmable master thermostat which selects either of the heating or cooling mode of the HVAC unit;
C. positioning the zone duct damper means open if the zone programmable master or slave thermostats are demanding the selected mode and closed for the other damper means;
D. activating the HVAC unit by the programmable master thermostat in the selected mode until all zone thermostat demanding the selected mode have been satisfied; and
E. deactivating the HVAC unit by the programmable master thermostat.

8. The method of claim 7 wherein step C includes the step of:

F. partially opening some of the damper means depending upon the amount of demand for the selected mode by their respective thermostats and modulating such damper means betw,een open and closed until the demand is satisfied.

9. The method of claim 8 wherein the respective control of the zone master and slave thermostats in step G includes the step of:

H. determining the zone temperature;
I. determining the duct temperature of the air in the supply duct; and
J. comparing the zone temperature to the duct temperature and
 (a) when the duct temperature is warmer than the zone temperature, the thermostat operates the zone duct damper in the heating mode and substantially opens the zone duct damper upon the thermostat sensing a zone demand for heat when the zone temperature is a predetermined amount below set point and substantially closes the zone duct damper upon the thermostat sensing no zone demand or a zone demand for cooling, and
 (b) when the duct temperature is cooler than the zone temperature, the thermostat operates the zone duct damper in the cooling mode and substantially opens the zone duct damper upon the thermostat sensing a zone demand for cooling when the zone temperature is a predetermined amount above set point and substantially closes the zone duct damper upon the thermostat sensing no zone demand or zone demand for heat.

10. The method of claim 8 wherein the respective control of the zone master and slave thermostats in step G includes the step of:

H. determining the zone temperature;
I. determining the duct temperature of the air in the supply duct; and
J. comparing the zone temperature to the duct temperature and
 (c) when there is no demand for heating or cooling in a zone or a demand different from that derived from a comparison of duct temperature and zone temperature in (1) or (2) and duct temperature is within predetermined limits established by the respective zone thermostat, the zone duct damper is operated in the ventilation mode and is opened to the ventilation position.

11. The method of claim 7 further comprising the step of:

F. selecting the mode of operation of the HVAC unit in step B in accordance with the programming of the programmable master thermostat such that when an equal number of zones demand heating and demand cooling and the number of such zones is greater than a preselected number programmed in the programmable master thermostat the zone with the greatest demand is chosen as the reference zone and the HVAC unit is operated in a mode coincident with the mode demanded by the zone with the greatest demand.

12. The method of claim 11 further comprising the step of:

G. modulating between open and closed positions the zone dampers according to the respective control of the zone thermostats when there is insufficient demand to require activation of the HVAC unit by the zone thermostats via the programmable master thermostat in step F.

13. The method of claim 11 further comprising the step of:

G. repeating steps B–F for the other mode when demand for the other mode has been selected in accord with step B.

14. The method of claim 11 further comprising the step of:

G. repeating steps B–F for the other mode when demand for the other mode has been selected in accord with step B.

15. The method of claim 11 further comprising the step of:

G. selecting by the programmable master thermostat a second reference zone if the demand in a second zone is of the same mode and if it exceeds the demand in the reference zone selected in step F.

16. The method of claim 15 further comprising the step of:

J. repeating steps B–G for the other mode when demand for the other mode has been selected in accord with step B.

17. The method of claim 11 further comprising the steps of:

G. increasing the heating or cooling output of the HVAC unit by the programmable master thermostat when duct temperature is not within predetermined setpoints established by the programmable master thermostat when the HVAC unit has been activated in accord with steps B–D.

18. The method of claim 17 further comprising the step of:

H. deactivating the increased heating or cooling of the HVAC unit by the programmable master thermostat if the duct temperature exceeds predetermined setpoints established by the programmable master thermostat.

19. The method of claim 17 further comprising the step of:

G. selecting the mode of operation of the HVAC unit in step C in accordance with the programming of the programmable master thermostat such that when an equal number of zones demand heating and demand cooling during a distinct time period and the number of such zones is greater than a preselected number programmed in the programmable master thermostat the zone with the greatest demand is chosen as the reference zone and the HVAC unit is operated in a mode coincident with the mode demanded by the zone with the greatest demand.

20. The method of claim 19 further comprising the step of:

H. modulating between open and closed positions the zone dampers according to the respective control of the zone thermostats when there is insufficient demand to require activation of the HVAC unit by the zone thermostats via the master thermostat in step E.

21. The method of claim 19 wherein the respective control of the zone thermostats in step G includes the steps of:

H. determining the zone temperature;

I. determining the duct temperature;

J. comparing the zone temperature to the duct temperature and (a) when the duct temperature is warmer than the zone temperature, the thermostat operates the zone duct damper in the heating mode and substantially opens the zone duct damper upon the thermostat sensing a zone demand for heat when the zone temperature is a predetermined amount below setpoint and substantially closes the zone duct damper upon the thermostat sensing no zone demand or a zone demand for cooling, and (b) when the duct temperature is cooler than the zone temperature, the thermostat operates the zone duct damper in the cooling mode and substantially opens the zone duct damper upon the thermostat sensing a zone demand for cooling when the zone temperature is a predetermined amount above setpoint and substantially closes the zone duct damper upon the thermostat sensing no zone demand or zone demand for heat.

22. The method of claim 19 wherein the respective control of the zone thermostats in step G includes the steps of:

H. determining the zone temperature;

I. determining the duct temperature;

J. comparing the zone temperature to the duct temperature and (c) when there is no demand for heating or cooling in a zone or a demand different from that derived from a comparison of duct temperature and zone temperature in (1) or (2) and duct temperature is within predetermined limits established by the respect zone thermostat, the zone duct damper is operated in the ventilation mode and is opened to the ventilation position.

23. A method of monitoring and controlling the condition of air within each of a plurality of zones being supplied with heated or cooled conditioned air from a single zone HVAC unit via a single duct system having zone ducts and zone duct damper means therein wherein one zone damper means and the HVAC unit is controlled by a programmable master thermostat, said method and the other zones are controlled by programmable slave thermostats comprising the steps of:

A. programming the setpoints of the zone thermostats during a plurality of distinct time periods:

B. determining the real time;

C. monitoring the demand for heating or cooling from all zone thermostats by the programmable master thermostat which selects either of the heating or cooling mode of the HVAC unit during a distinct time period;

D. positioning the zone duct damper means open if the zone thermostats are demanding the selected mode and closed for the other damper means;

E. activating the HVAC unit by the programmable master thermostat in the selected mode until all the zone thermostats demanding the selected mode have been satisfied;

F. deactivating the HVAC unit by the programmable master thermostat.

24. The method of claim 23 further comprising the step of:

G. repeating steps B–F for the other mode when demand for the other mode has been selected in accord with step C.

25. The method of claim 24 further comprising the step of:

H. selecting a second reference zone if the demand in a second zone is of the same mode and if it exceeds the demand in the reference zone selected in step G.

26. The method of claim 25 further comprising the step of:

I. repeating steps B–I for the other mode when demand for the other mode has been selected in accord with step C.

27. The method of claim 26 further comprising the steps of:

J. increasing the heating or cooling output of the HVAC unit by the programmable master thermostat when duct temperature is not within predetermined setpoints established by the programmable master thermostat when the HVAC unit has been activated in accordance with steps B–E.

28. The method of claim 27 further comprising the step of:

K. deactivating the increased heating or cooling of the HVAC unit by the programmable master thermostat if the duct temperature exceeds predetermined setpoints established by the programmable master thermostat.

29. In a system for monitoring and controlling the condition of air in each of a plurality of zones when using a single HVAC unit to supply conditioned air to each zone via a damper means in a duct communicating with each zone, said system comprising a programmable master thermostat means located in one zone to be controlled and interfaced with and controlling said damper means in said duct communicating with said one zone and controlling said HVAC unit, said programmable master thermostat receiving information from a programmable slave thermostat means located in each other zone interfaced with and controlling respective said damper means in respective said duct communicating with respective said other zone, each said thermostat determining the condition of the air in its associated said zone, said programmable master thermostat means activating said HVAC unit in accordance with its programming and in accordance with the information received from each said programmable slave thermostat means and in accordance with information associated with its own zone to control said HVAC unit in the heating or cooling mode.

30. In the system as defined in claim 29 wherein said programmable master thermostat means provides information to each said programmable slave thermostat means as to the desired mode of operation of said HVAC unit, each said programmable slave thermostat means controlling the positioning of its respective said damper means in the selected mode and said programmable master thermostat means controlling its own said damper means prior to the activation of said HVAC unit by said programmable master thermostat means.

31. In the system as defined in claim 30 wherein the information exchanged between said programmable master thermostat and said programmable slave thermostat is in the form of digital words.

32. In the system as defined in claim 31 wherein said programmable master thermostat and each said programmable slave thermostat include a first sensor for determining the temperature of the air in respective said zone and include a second sensor for determining the temperature of air in the respective said duct supplying air to respective said zone.

33. In the system as defined in claim 32 wherein said programmable master thermostat means and each said programmable slave thermostat means include means for establishing the desired temperature in respective said zone.

34. In the system as defined in claim 33 wherein said programmable master thermostat means determines the demand for heating or cooling from all said zone thermostat means, determines the number of zones having demand for heating or cooling, compares such number with a preselected number defining the system demand number, and if the number of zones demanding heating or cooling equals or exceeds said system demand number, said programmable master thermostat means selects the desired heating or cooling mode respectively of said HVAC unit and provides output signals to its said damper control means and to all said programmable slave thermostat means for operating respective said damper means in a mode coincident with the desired mode of said HVAC unit, said programmable master thermostat means thereafter actuates said HVAC unit in the selected mode until all said programmable thermostat means demanding the selected mode have been substantially satisfied and then deactivating said HVAC unit.

35. In the system as defined in claim 34 wherein said programmable master thermostat means compares the number of zones having a demand for heating and cooling and if the number of zones having a demand for heating is equal to the number of zones demanding cooling and the numbers equal or exceed the system demand number, said programmable master thermostat means selects the zone with the greatest demand as a reference zone and activates said HVAC unit in the mode coincident to that demanded by said reference zone until said reference zone is substantially satisfied.

36. In the system as defined in claim 35 wherein said programmable master thermostat means periodically determines the demand from each zone and, if the demand in another said zone, having a demand coincident with the mode in which said HVAC unit is activated, is greater than said reference zone, said other zone is selected as a new reference zone and said HVAC unit is operated until demand in said new reference zone is substantially satisfied.

37. In the system as defined in claim 36 wherein said programmable master thermostat means periodically receives duct temperature data from duct supplying said one zone and receives duct temperature data from each said programmable slave thermostat and, if any duct temperature is not within predetermined setpoints established by said programmable master thermostat means, when said HVAC unit is being operated in the heating or cooling mode, said programmable master thermostat means provides an output signal to said HVAC unit for increasing the heating or cooling output respectively of said HVAC unit.

38. In the system as defined in claim 37 wherein said programmable master thermostat means deactivates said HVAC unit if duct temperature in any said duct exceeds predetermined setpoints established by said programmable master thermostat means without regard to the demand for heating or cooling in any said zone.

39. In the system as defined in claim 38 wherein each said thermostat means includes indicating means for providing data indicative of the information in any digital word associated with the operation of said thermostat means.

40. In a system for monitoring and controlling the condition of air in each of a plurality of zones when using a single HVAC unit to supply conditioned air to each zone via a damper means in a duct communicating with each zone, said system comprising a programmable master thermostat means responsive to signals indicative of the real time and located in one zone to be controlled and interfaced with and controlling said damper means in said duct communicating with said one zone and controlling said HVAC unit, means for providing signals indicative of the real time to said programmable master thermostat means, said programmable master thermostat receiving information from a programmable slave thermostat means located in each other zone interfaced with and controlling respective said damper means in respective said duct communicating with respective said other zone, each said thermostat determining the condition of the air in its associated said zone, said programmable master thermostat means activating said HVAC unit in accordance with its programming and in accordance with the information received from each said programmable slave thermostat means and in accordance with information associated with its own zone to control said HVAC unit in the heating or cooling mode during distinct time periods established by the programming of said master programmable thermostat means and said programmable slave thermostat means.

41. In the system as defined in claim 40 wherein said means for providing signals indicative of the real time controls the operability of said programmable master thermostat means and each said programmable slave thermostat means according to different conditions during distinct time periods.

42. In the system as defined in claim 40 wherein said programmable master thermostat means provides information including data indicative of the real time to each said programmable slave thermostat means and including the desired mode of operation of said HVAC unit, each said programmable slave thermostat means controlling the positioning of its respective said damper means in the selected mode and said programmable master thermostat means controlling its own said damper means prior to the activation of said HVAC unit by said programmable master thermostat means.

43. In the system as defined in claim 42 wherein the information exchanged between said programmable master thermostat and said programmable slave thermostat is in the form of digital words.

44. In the system as defined in claim 43 wherein said programmable master thermostat and each said programmable slave thermostat include a first sensor for determining the temperature of the air in respective said zone and include a second sensor for determining the temperature of air in the respective said duct supplying air to respective said zone.

45. In the system as defined in claim 44 wherein said programmable master thermostat means and each said programmable slave thermostat means include means for establishing the desired temperature in respective said zone during a distinct time period.

46. In the system as defined in claim 45 wherein said programmable master thermostat means determines the demand for heating or cooling from all said zone thermostat means, during a distinct time period determines the number of zones having demand for heating or cooling, compares such number with a preselected number defining the system demand number, and if the number of zones demanding heating or cooling equals or exceeds said system demand number during a distinct time period, said programmable master thermostat means selects the desired heating or cooling mode respectively of said HVAC unit and provides output signals to its said damper control means and to all said programmable slave thermostat means for operating respective said damper means in a mode coincident with the desired mode of said HVAC unit, said programmable master thermostat means thereafter actuates said HVAC unit in the selected mode until all said programmable thermostat means demanding the selected mode have been substantially satisfied and then deactivating said HVAC unit.

47. In the system as defined in claim 46 wherein said programmable master thermostat means compares the number of zones having a demand for heating and cooling and if the number of zones having a demand for heating is equal to the number of zones demanding cooling and the numbers equal or exceed the system demand number during a distinct time period, said programmable master thermostat means selects the zone with the greatest demand as a reference zone and activates said HVAC unit in the mode coincident to that demanded by said reference zone until said reference zone is substantially satisfied.

48. In the system as defined in claim 47 wherein said programmable master thermostat means periodically determines the demand from each zone and, if the demand in another said zone, having a demand coincident with the mode in which said HVAC unit is activated, is greater than said reference zone, said other zone is selected as a new reference zone and said HVAC unit is operated until demand in said new reference zone is substantially satisfied.

49. In the system as defined in claim 48 wherein said programmable master thermostat means periodically receives duct temperature data from duct supplying said one zone and receives duct temperature data from each said programmable slave thermostat and, if any duct temperature is not within predetermined setpoints established by said programmable master thermostat means, when said HVAC unit is being operated in the heating or cooling mode, said programmable master thermostat means provides an output signal to said HVAC unit for increasing the heating or cooling output respectively of said HVAC unit.

50. In the system as defined in claim 49 wherein each said thermostat means includes indicating means for providing data indicative of the information in any digital word associated with the operation of said thermostat means including the real time.

51. In a system for monitoring and controlling the condition of air in a plurality of zones within predetermined operating limits using a single zone HVAC unit in which conditioned air passes into a plurality of zones via a plurality of dampers in a plurality of ducts communicating with respective zones, said system comprising a programmable master thermostat means for operating said HVAC unit said damper in one said zone comprising:

master first circuit means responsive to input signals for establishing operating limits for said one zone and providing a first digital word output signal representative of said operating limits;

master second circuit means responsive to input signals indicative of the actual condition of air in said one zone for providing a second digital word output signal representative of the actual condition of air therein;

master third circuit means adapted to be coupled to a peripheral circuit means for receiving data from a peripheral circuit means and for providing a third digital word output signal representative of the information contained in such data;

master fourth circuit means responsive to output signals from said first, second, and third circuit means for providing fourth digital word output signals for operating said damper associated with said one zone and said HVAC unit;

master programmable logic means for providing digital word input signals to said fourth circuit means for selectively controlling said fourth circuit means; and master logic means for selectively operating said damper associated with said one zone and said HVAC unit in response to respective said fourth digital word input signals from said fourth circuit means; and programmable slave thermostat means for operating said damper in each said other zone comprising:

slave first circuit means responsive to input signals for establishing operating limits for said other zone and providing a first digital word output signal representative of said operating limits;

slave second circuit means responsive to input signals indicative of the actual condition of air in said other zone for providing a second digital word output signal representative of the actual condition of air therein;

slave third circuit means adapted to be coupled to said programmable master thermostat means for receiving data from said programmable master thermostat means and for providing a third digital word output signal representative of the information contained in such data;

slave fourth circuit means responsive to output signals from said first, second, and third circuit means for providing fourth digital word output signals for operating said damper associated with said other zone;

slave programmable logic means for providing digital word input signals to said fourth circuit means for selectively controlling said fourth circuit means; and slave logic means for selectively operating said damper associated with said other zone in response to respective said fourth digital word input signals from said fourth circuit means.

52. In the system as defined in claim 51 wherein said programmable master thermostat means includes means for providing signals indicative of the real time and providing a real time reference for the operation of said programmable master thermostat means and each said programmable slave thermostat means according to different parameters during distinct time periods, each said master and slave first circuit means including means responsive to input signals for establishing separate and different desired operating conditions in said zone during distinct time periods established by said programmable master thermostat means.

53. In the system as defined in claim 51 wherein said programmable master thermostat means includes means for providing information to said programmable slave thermostat means, the information including any digital word signal associated with said first, second and third circuit means and said programmable logic means.

54. In the system defined in claim 53 wherein each said thermostat means further comprises a first sensor located in its respective zone for providing an output signal representative of the actual temperature of respective said zone, said second circuit means including means responsive to said output signal from said first sensor for providing a second digital word output signal representative of the actual temperature in said respective zone.

55. In the system defined in claim 54 wherein said master and said slave first circuit means includes means responsive to input signals for establishing the desired temperature in said respective zone and providing a first digital word output signal representative of the desired temperature therein.

56. In a system defined in claim 55 wherein said master and said slave fourth circuit means is selectively controlled by respective said programmable logic means for comparing a digital word representative of the actual temperature of said respective zone and a digital word representative of desired temperature in said respective zone for determining the demand for heating or cooling or no demand in said respective zone.

57. In the system defined in claim 56 wherein each said thermostat means further comprises a second sensor located in each said duct for determining the temperature therein and providing an output signal representative of the temperature in each said duct, each said master and slave second circuit means responsive to said output signal from said second sensor and providing a digital word output signal representative of the temperature of each said duct.

58. In a system defined in claim 57 wherein said master and said slave fourth circuit means is selectively controlled by respective said programmable logic means for comparing a digital word representative of zone temperature in said respective zone and a digital word representative of duct temperature for determining the desired mode of operation of said respective damper.

59. In a system defined in claim 58 wherein said fourth circuit means in said programmable master thermostat means is selectively controlled by said programmable logic means for determining the desired mode of operation of said HVAC unit in response to the demand for heating or cooling or no demand in said zones.

60. In the system defined in claim 59 wherein said programmable logic means in each said thermostat means includes a first program means such that when duct temperature in said respective duct is greater than zone temperature a digital word output signal is provided from said fourth circuit means to said logic means for operating said respective damper in the heating mode and for operating said respective damper in the cooling mode when the temperature in said respective duct is less than zone temperature when said HVAC unit is deactivated.

61. In the system defined in claim 60 wherein said programmable logic means in said programmable master thermostat means includes a second program means such that when sufficient demand for heating or cooling exists in said zones said programmable master thermostat means provides a first output signal to said programmable slave thermostat means for positioning said respective damper in the heating or cooling mode respectively and the master fourth circuit means provides a signal to the master logic means for operating its damper means in the heating or cooling mode; a second output signal for activating said HVAC unit in the heating or cooling mode respectively; and, when sufficient demand for heating or cooling no longer exists in said zones, a third output signal for deactivating said HVAC unit.

62. In the system defined in claim 61 wherein said programmable logic means in each said programmable thermostat means includes a third program means such that when said HVAC unit is deactivated, said fourth circuit means provides digital word output signals to said logic means for operating said respective damper in the heating or cooling or ventilation mode in response to a comparison of duct temperature of said respective duct, and desired zone temperature and actual zone temperature of said respective zone.

63. In the system as defined in claim 62 wherein said programmable logic means in each said programmable thermostat means includes a fourth program means such that when duct temperature of its respective said duct is within predetermined limits established by said programmable logic means digital word signals are provided from said fourth circuit means to its respective said logic means for operating its respective said damper in the ventilation mode when there is no demand for heating or cooling in said respective zone or a demand different from that derived from a comparison between actual zone temperature and duct temperature in said respective zone.

64. In a system defined in claim 63 wherein said master fourth circuit means is selectively controlled by said master programmable logic means for determining the desired mode of operation of said HVAC unit in response to data received by said master third circuit means representative of the temperature of air in each said zone controlled by said programmable slave thermostats and in response to data indicative of the condition of air in its respective said one zone.

65. In the system as defined in claim 64 wherein said master fourth circuit means is selectively controlled by said master programmable logic means in response to data indicative of the demand for heating or cooling or no demand in its respective zone and in response to data received by said master third circuit means indicative of the demand for heating or cooling or no demand from respective said zones controlled by said programmable slave thermostat means for providing output signals representative of the desired mode of operation of said HVAC unit when the number of zones having demand for heating or cooling equals or exceeds a predetermined number established by said master first circuit means.

66. In the system as in claim 65 wherein said master programmable logic means includes fifth program means such that when demand for heating or cooling exists in a number of said zones equal to or exceeding the predetermined number established by said master first circuit means, said programmable master thermostat means provides first output signals to said programmable slave thermostat means associated with said other zones indicative of the desired mode of said HVAC unit, a second signal to said master logic means for operating said damper associated with its respective said zone in the heating or cooling mode, respectively, a third signal to said master logic means for operating said HVAC unit in the heating or cooling mode, respectively; and a fourth output signal to said master logic means for deactivating said HVAC unit when sufficient demand for heating or cooling no longer exists.

67. In the system defined in claim 66 wherein said master programmable logic means includes a sixth program means such that when the number of said zones demanding heating or cooling equals or exceeds a predetermined number established by said master first circuit means, the zone with the greatest demand is chosen as a reference zone and said HVAC unit is operated by said master logic means in the heating or cooling mode, respectively, until said reference zone is substantially satisfied.

68. In the system defined in claim 67 wherein said master programmable logic means includes a seventh program means such that when the number of said zones demanding heating is equal to the number of said zones demanding cooling, each said heating and cooling number being greater than a predetermined number established by said master first circuit means said programmable master thermostat means provides a first output signal to said programmable slave thermostat means and to said master logic means for operating all said dampers in a mode coincident with the heating or cooling mode of the zone with the greatest demand, a second output signal to said master logic means for activating said HVAC unit in a mode coincident with the demand for heating or cooling mode of the zone with the greatest demand, and a third output signal to said master logic means for deactivating said HVAC unit when the demand for heating or cooling has been substantially satisfied in the zone with the greatest demand.

69. In the system defined in claim 68 wherein said master programmable logic means includes an eighth program means such that when said HVAC unit has been activated in the heating or cooling mode duct temperature associated with its respective said zone and data indicative of duct temperature in each other said zones received by said master third circuit means from said programmable slave thermostat means is compared with first predetermined limits established by said master programmable logic means and said master fourth circuit means provides an output signal to said master logic means for increasing the heating or cooling supplied by said HVAC unit when duct temperature is not within said first predetermined limits.

70. In the system defined in claim 69 wherein said master programmable logic means includes a ninth program means such that when duct temperature in any said zone exceeds a second predetermined limit established by said master programmable logic means, said master fourth circuit means provides an output signal to said master logic means for deactivating said HVAC unit regardless of the demand for heating or cooling in any said zone.

71. In the system defined in claim 70 wherein said master programmable logic means includes a tenth program means such that, when insufficient demand for heating or cooling for operation of said HVAC unit exists and the duct temperature associated with its said zone is not within the predetermined setpoints for the ventilation mode, said master fourth circuit means provides an output signal to said master logic means for operating its said damper associated with its said zone in the heating or cooling mode in response to a comparison of actual zone temperature and duct temperature associated with its said zone.

72. In the system as defined in claim 71 wherein said master programmable logic means includes an eleventh program means such that, when said zone having the greatest demand has been chosen as a first reference zone during operation of said HVAC unit in the heating or cooling mode, another said zone is chosen as the reference zone if said other zone develops a greater demand for heating or cooling respectively than said first reference zone and said HVAC unit is operated by said master logic means in the heating or cooling mode respectively until said other zone is substantially satisfied.

73. In the system as defined in claim 72 wherein said programmable master thermostat means includes clock means for providing a real time reference for the operation of said programmable master thermostat means including each said program means thereof and each said programmable slave thermostat means, each master and slave said first circuit means including said means responsive to input signals for establishing separate and different operating conditions in said zone during distinct time periods.

74. A method for controlling a single HVAC and a plurality of dampers prior to activating the HVAC unit that supplies conditioned air through a duct system having a plurality of ducts to a plurality of zones and a master zone thermostat and slave zone thermostats associated with respective dampers, said method comprising the steps of:

A. determining by the master zone thermostat the demand for heating or cooling from all zone thermostats and selecting a heating or cooling mode therefrom;

B. activating appropriate dampers to closed positions if the zone thermostats controlling such appropriate dampers have no demand or a demand different than the mode selected in step A, and positioning open the other dampers;

C. activating the HVAC unit by the master zone thermostat in the selected mode until all zone thermostats demanding the selected mode have been satisfied;

D. deactivating the HVAC unit by the master zone thermostat; and

E. repeating steps A–D for the other mode when demand for the other mode has been selected in accord with step A.

75. The method of claim 74 wherein step B includes the step of:

F. activating some of the other dampers to a partially open position depending upon the amount of demand by their respective thermostats.

76. The method of claim 74 wherein step B includes the step of:

F. modulating such other dampers between open and closed positions until the demand is satisfied in their respective zones.

77. The method of claim 74 further comprising the step of:

F. modulating between open and closed positions the zone dampers according to the respective control of the zone thermostats when there is insufficient demand to require activation of the HVAC unit in the heating or cooling mode by the zone thermostats from step A.

78. The method of claim 77 wherein the respective control of each of the zone thermostats in step F includes the steps of:

G. determining the zone temperature;

H. determining the duct temperature; and

I. comparing the zone temperature to the duct temperature and (1) when the duct temperature is warmer than the zone temperature, the thermostat operates the zone duct damper in the heating mode and modulates open proportionate to heat demand the zone duct damper upon the thermostat sensing a zone demand for heat when the zone temperature is a predetermined amount below set point and modulates closed the zone duct damper upon the thermostat sensing no zone demand or a zone demand for cooling, and (2) when the duct temperature is cooler than the zone temperature, the thermostat operates the zone duct damper in the cooling mode and modulates open proportionate to cooling demand the zone duct damper upon the thermostat sensing a zone demand for cooling when the zone temperature is a predetermined amount above set point and modulates closed the zone duct damper upon the thermostat sensing no zone demand or zone demand for heat.

79. The method of claim 74 wherein step A includes the steps of:

F. determining by the master zone thermostat the number of zones having a demand for heating or cooling from all zone thermostats;

G. selectively preselecting the number of zones having demand for heating or cooling that is necessary to select the heating or cooling mode by the master zone thermostat;

H. comparing the respective number obtained from steps F and G to provide such of a heating or cooling mode when the number of zones having a demand for heating or cooling respectively is equal to or greater than the number selected in step G.

80. The method of claim 79 further comprising the step of:

I. comparing the number of demands after steps A, F, G and H and if the demands for heating and cooling are equal, the HVAC unit will be activated in step C in the mode coincident with the demand of the zone with the greatest demand.

81. The method of claim 80 further comprising the step of:

J. modulating between open and closed positions the zone dampers according to the respective control of the zone thermostats when there is insufficient demand to require activation of the HVAC unit in the heating or cooling mode by the zone thermostats from steps A, F, G and H.

82. The method of claim 81 wherein the respective control of each of the zone thermostats in step J includes the steps of:

K. determining the zone temperature;

L. determining the duct temperature; and

M. comparing the zone temperature to the duct temperature and (1) when the duct temperature is warmer than the zone temperature, the thermostat operates the zone duct damper in the heating mode and opens the zone duct damper upon the thermostat sensing a zone demand for heat when the zone temperature is a predetermined amount below set point and closes the zone duct damper upon the thermostat sensing no zone demand or a zone demand for cooling, and (2) when the duct temperature is cooler than the zone temperature, the thermostat operates the zone duct damper in the cooling mode and opens the zone duct damper upon the thermostat sensing a zone demand for cooling when the zone temperature is a predetermined amount above set point and closes the zone duct damper upon the thermostat sensing no zone demand or zone demand for heat.

83. The method of claim 82 wherein the respective control of each of the zone thermostats in step J includes the steps of:

N. operating the zone duct damper in the ventilation mode when there is no demand for heating or cooling in a zone or a demand different from that derived from a comparison of duct temperature and zone temperature in steps M;

M. and duct temperature is within predetermined limits.

84. A method of monitoring and controlling the condition of air within each of a plurality of zones being supplied with heated or cooled conditioned air from a single zone HVAC unit via a single duct system having zone ducts and zone duct damper means therein wherein one zone damper means and the HVAC unit is controlled by a programmable master thermostat and the other zones are controlled by programmable slave thermostats, said method comprising the steps of:

A. setting the setpoint of each of the zone thermostats to a level for the respective zones;

B. monitoring the demand for heating or cooling from all zone thermostats by the programmable master thermostat which selects either of the heating or cooling mode of the HVAC unit;

C. positioning the zone duct damper means open if the zone programmable master or slave thermostats are demanding the selected mode and closed for the other damper means;

D. activating the HVAC unit by the programmable master thermostat in the selected mode until all zone thermostat demanding the selected mode have been satisfied;

E. deactivating the HVAC unit by the programmable master thermostat; and

F. repeating steps B–F for the other mode when demand for the other mode has been selected in accord with step B.

85. The method of claim 84 further comprising the step of:

G. modulating between open and closed positions the zone dampers according to the respective control of the zone thermostats when there is insufficient demand to require activation of the HVAC unit.

86. The method of claim 84 further comprising the step of:

G. selecting by the programmable master thermostat a second reference zone if the demand in a second zone is of the same mode and if it exceeds the demand in the reference zone selected in step G.

87. The method of claim 84 further comprising the step of:

G. selecting the mode of operation of the HVAC unit in step B in accordance with the programming of the programmable master thermostat such that when an equal number of zones demand heating and demand cooling and the number of such zones is greater than a preselected number programmed in the programmable master thermostat the zone with the greatest demand is chosen as the reference zone and the HVAC unit is operated in a mode coincident with the mode demanded by the zone with the greatest demand.

88. The method of claim 87 further comprising the steps of:

H. increasing the heating or cooling output of the HVAC unit by the programmable master thermostat when duct temperature is not within predetermined setpoints established by the programmable master thermostat when the HVAC unit has been activated in accord with steps B–D.

89. The method of claim 88 further comprising the step of:

I. deactivating the increased heating or cooling of the HVAC unit by the programmable master thermostat if the duct temperature exceeds predetermined setpoints established by the programmable master thermostat.

90. The method of claim 84 wherein step C includes the step of:

G. partially opening some of the damper means depending upon the amount of demand for the selected mode by their respective thermostats and modulating such damper means between open and closed until the demand is satisfied.

91. The method of claim 90 wherein the respective control of the zone master and slave thermostats in step G includes the step of:

H. determining the zone temperature;

I. determining the duct temperature of the air in the supply duct; and

J. comparing the zone temperature to the duct temperature and (a) when the duct temperature is warmer than the zone temperature, the thermostat operates the zone duct damper in the heating mode and opens the zone duct damper upon the thermostat sensing a zone demand for heat when the zone temperature is a predetermined amount below set point and closes the zone duct damper upon the thermostat sensing no zone demand or a zone demand for cooling, and (b) when the duct temperature is cooler than the zone temperature, the thermostat operates the zone duct damper in the cooling mode and opens the zone duct damper upon the thermostat sensing a zone demand for cooling when the zone temperature is a predetermined amount above set point and closes the zone duct damper upon the thermostat sensing no zone demand or zone demand for heat.

92. The method of claim 91 wherein the respective control of the zone master and slave thermostats in step G includes the step of:

K. operating the zone duct damper open in the ventilation mode when there is no demand for heating or cooling in a zone or a demand different from that derived from a comparison of duct temperature and zone temperature in steps J. (1) or J. (2) and duct temperature is within predetermined limits established by the respective zone thermostat.

* * * * *